United States Patent
Liang

(10) Patent No.: US 12,555,588 B2
(45) Date of Patent: Feb. 17, 2026

(54) SPEECH ENCODING AND DECODING METHODS AND APPARATUSES, COMPUTER DEVICE, AND STORAGE MEDIUM

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 142 days.

(21) Appl. No.: 18/629,780

(22) Filed: Apr. 8, 2024

(65) Prior Publication Data

US 2024/0274143 A1    Aug. 15, 2024

Related U.S. Application Data

(63) Continuation of application No. PCT/CN2023/111042, filed on Aug. 3, 2023.

(30) Foreign Application Priority Data

Sep. 5, 2022   (CN) .......................... 202211076921.7

(51) Int. Cl.
  *G10L 19/02*    (2013.01)
  *G10L 19/032*   (2013.01)
  (Continued)

(52) U.S. Cl.
  CPC ........ *G10L 19/0208* (2013.01); *G10L 19/032* (2013.01); *G10L 19/083* (2013.01);
  (Continued)

(58) Field of Classification Search
  CPC .......................... G10L 19/0208; G10L 19/083
  See application file for complete search history.

(56) References Cited

U.S. PATENT DOCUMENTS 5,235,671 A * 8/1993 Mazor .................... H04B 1/667
                                                    704/200
5,937,378 A * 8/1999 Serizawa ............ G10L 19/0208
                                                    704/219
(Continued)

FOREIGN PATENT DOCUMENTS

CN      101710489 A    5/2010
CN      101989428 A    3/2011
(Continued)

OTHER PUBLICATIONS

Tencent Technology, ISR, PCT/CN2023/111042, Nov. 23, 2023, 2 pgs.

*Primary Examiner* — Shaun Roberts
(74) *Attorney, Agent, or Firm* — Morgan, Lewis & Bockius LLP

(57) ABSTRACT

This application relates to a speech encoding method performed by a computer device the method, including: performing subband decomposition on a target speech signal to obtain a plurality of subband excitation signals; obtaining an auditory perception representational value that corresponds to each subband excitation signal; determining at least one first subband excitation signal and at least one second subband excitation signal from the at least two subband excitation signals; obtaining a gain of each of the at least one first subband excitation signal relative to a preset reference excitation signal as an encoding parameter that corresponds to the first subband excitation signal; obtaining a corresponding encoding parameter that is obtained by quantizing each of the at least one second subband excitation signal; and performing encoding on each subband excitation signal based on the encoding parameter corresponding to the subband excitation signal.

20 Claims, 9 Drawing Sheets

(51) Int. Cl.
  *G10L 19/083* (2013.01)
  *G10L 25/21* (2013.01)
  *G10L 19/00* (2013.01)
  *G10L 19/26* (2013.01)

(52) U.S. Cl.
  CPC ...... *G10L 25/21* (2013.01); *G10L 2019/0013* (2013.01); *G10L 19/26* (2013.01)

(56) References Cited

U.S. PATENT DOCUMENTS

| | | | | |
|---|---|---|---|---|
| 6,298,322 | B1* | 10/2001 | Lindemann | G10L 19/02 704/E19.01 |
| 6,363,338 | B1* | 3/2002 | Ubale | G10L 19/002 704/229 |
| 8,392,198 | B1 | 3/2013 | Berisha et al. | |
| 2002/0072899 | A1* | 6/2002 | Paksoy | G10L 19/0208 704/219 |
| 2005/0058208 | A1* | 3/2005 | Ehara | H04L 1/0015 375/241 |
| 2006/0200346 | A1* | 9/2006 | Chan | G10L 25/69 704/E19.002 |
| 2008/0040122 | A1* | 2/2008 | Chen | G10L 19/005 704/E19.003 |
| 2010/0063812 | A1* | 3/2010 | Gao | G10L 19/002 704/230 |
| 2012/0069898 | A1* | 3/2012 | Valin | G10L 19/0204 375/240.18 |
| 2012/0095756 | A1* | 4/2012 | Sung | G10L 19/06 704/219 |
| 2014/0081629 | A1* | 3/2014 | Gao | G10L 19/24 704/208 |
| 2014/0188464 | A1* | 7/2014 | Choo | G10L 19/032 704/206 |
| 2015/0073784 | A1* | 3/2015 | Gao | G10L 19/22 704/223 |
| 2015/0162884 | A1* | 6/2015 | Baumgarte | H03G 3/20 381/107 |
| 2016/0055858 | A1* | 2/2016 | Tang | G10L 19/16 704/262 |

FOREIGN PATENT DOCUMENTS

| | | |
|---|---|---|
| CN | 114762042 A | 7/2022 |
| CN | 115171709 A | 10/2022 |
| WO | WO 2021113416 A1 | 6/2021 |

* cited by examiner

SPEECH ENCODING AND DECODING METHODS AND APPARATUSES, COMPUTER DEVICE, AND STORAGE MEDIUM

CROSS-REFERENCE TO RELATED APPLICATIONS

This application is a continuation application of PCT Patent Application No. PCT/CN2023/111042, entitled "SPEECH ENCODING AND DECODING METHODS AND APPARATUSES, COMPUTER DEVICE, AND STORAGE MEDIUM" filed on Aug. 3, 2023, which claims priority to Chinese Patent Application No. 2022110769217, entitled "SPEECH ENCODING AND DECODING METHODS AND APPARATUSES, COMPUTER DEVICE, AND STORAGE MEDIUM" filed on Sep. 5, 2022, all of which is incorporated herein by reference in its entirety.

FIELD OF THE TECHNOLOGY

This application relates to the field of speech processing technologies, and in particular, to a speech encoding method and apparatus, a computer device, a storage medium, and a computer program product, and to a speech decoding method and apparatus, a computer device, a storage medium, and a computer program product.

BACKGROUND OF THE DISCLOSURE

Speech encoding is widely applied in daily communication. While ensuring high-quality speech transmission, speech encoding reduces channel bandwidths required for speech transmission. For example, in a voice calling application, a transmit end collects speech data, encodes the speech data, and transmits encoded data to a receive end, so that the receive end can regenerate the speech data through decoding and change the speech data into sound.

Currently, speech encoding technologies are mainly classified into three categories: waveform encoding technologies, parametric encoding technologies, and hybrid encoding technologies. Specifically, a waveform encoding technology processes speech data as general waveform data, so that reconstructed speech waveforms are in original waveform shapes. A parametric encoding technology ensures, through extraction and encoding of feature parameters of speech data, that reconstructed speech data retains semantics of original speech. A hybrid encoding technology, combining a waveform encoding technology and a parametric encoding technology, includes both feature parameters of speech and encoded data of waveforms. However, current speech encoding methods are inefficient in encoding.

SUMMARY

According to embodiments provided in this application, the following is provided: a speech encoding method and apparatus, a computer device, a non-transitory computer-readable storage medium, and a computer program product, and a speech decoding method and apparatus, a computer device, a computer-readable storage medium, and a computer program product.

According to one aspect, this application provides a speech encoding method. The method is performed by a first device and includes:

performing subband decomposition on a target speech signal to obtain a plurality of subband excitation signals;

obtaining an auditory perception representational value that corresponds to each subband excitation signal;

determining at least one first subband excitation signal and at least one second subband excitation signal from the at least two subband excitation signals, the auditory perception representational value of each first subband excitation signal being less than or equal to a preset auditory perception threshold, and the auditory perception representational value of each second subband excitation signal being greater than the auditory perception threshold;

obtaining a gain of each of the at least one first subband excitation signal relative to a preset reference excitation signal as an encoding parameter that corresponds to the first subband excitation signal;

obtaining a corresponding encoding parameter that is obtained by quantizing each of the at least one second subband excitation signal; and performing encoding for each subband excitation signal based on the encoding parameter corresponding to the subband excitation signal.

According to another aspect, this application further provides a computer device. The computer device includes a memory and a processor. The memory stores computer-readable instructions. The processor, when executing the computer-readable instructions, causes the computer device to implement operations of the speech encoding method.

According to another aspect, this application further provides a non-transitory computer-readable storage medium. The computer-readable storage medium has computer-readable instructions stored therein. The computer-readable instructions, when being executed by a processor of a computer device, cause the computer device to implement operations of the speech encoding method.

Details of one or more embodiments of this application are provided in accompanying drawings and descriptions below. Other features, objectives, and advantages of this application become apparent in the description of embodiments, accompanying drawings, and claims.

BRIEF DESCRIPTION OF THE DRAWINGS

To describe technical solutions in embodiments of this application or the conventional technology more clearly, the following briefly describes accompanying drawings required for describing the embodiments or the conventional technology. It is clear that the accompanying drawings described below are merely embodiments of this application. Without creative efforts, a person of ordinary skill in the art may obtain other drawings based on the disclosed accompanying drawings.

DESCRIPTION OF EMBODIMENTS

To make objectives, technical solutions, and advantages of this application clearer, the following further describes this application in detail with reference to accompanying drawings and embodiments. The specific embodiments described herein are only used for explaining this application rather than limiting this application.

This application relates to a speech encoding technology and a speech decoding technology. Speech encoding means converting analog speech signals into digital signals, and compressing speech data through leveraging of redundancy in the speech data and auditory characteristics of humans. Encoded data is transmitted. Speech decoding means decoding encoded data after the encoded data is received, to regenerate digital speech signals. Finally, a loudspeaker changes the digital speech signals into sound. Speech encoding and decoding effectively reduce bandwidths required for transmission of speech signals, and play a decisive role in reducing storage and transmission costs of speech information and ensuring integrity of speech information during transmission over a communication network.

A speech encoding method and a speech decoding method provided in the embodiments of this application may be used on a system that includes a first device and a second device. After performing speech encoding to obtain encoded data, one of the first device and the second device may transmit the encoded data to the other device. After receiving the encoded data, the other device may perform decoding for restoration, to obtain speech signals that may be used for playing. The first device and the second device are connected by using a wired or wireless network. The first device and the second device may be computer devices. A computer device may be a terminal or a server. A terminal may be but is not limited to any desktop computer, notebook computer, smartphone, tablet computer, internet of things device, or portable wearable device. An internet of things device may be a smart speaker, a smart TV, a smart air conditioner, a smart vehicle-mounted device, or the like. A portable wearable device may be a smart watch, a smart band, a head-mounted device, or the like. A server may be implemented by a standalone server or a server cluster that includes a plurality of servers.

Figure 1:
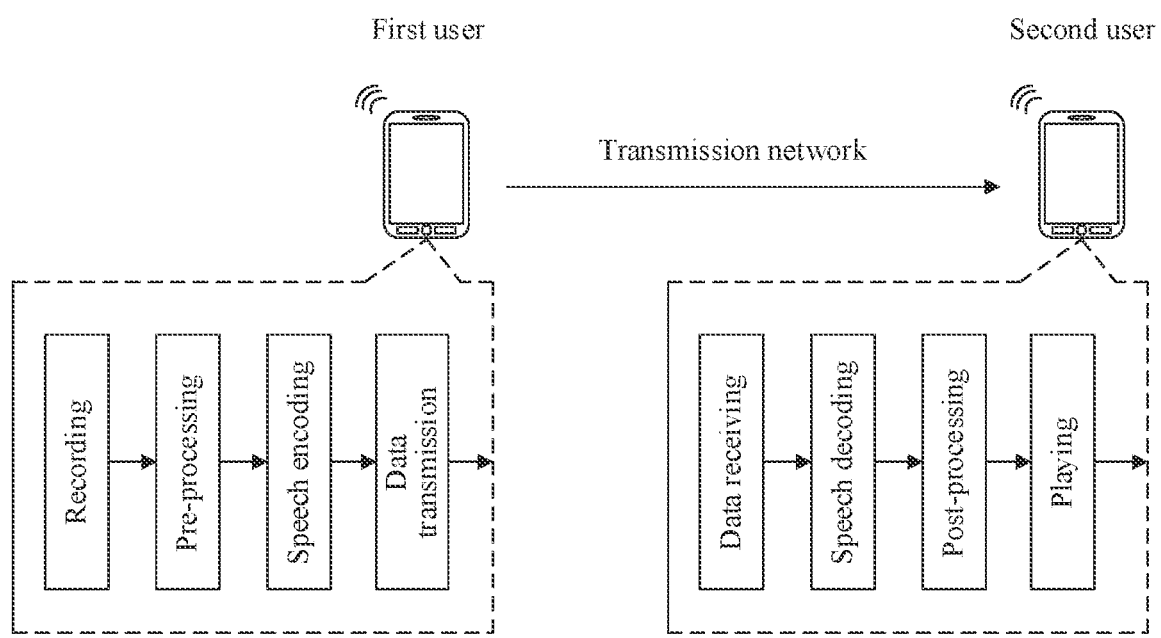
FIG. 1 is a diagram of an application environment of a speech encoding method and a speech decoding method according to an embodiment.

In an embodiment, FIG. 1 is a diagram of an application environment of a speech encoding method and a speech decoding method according to an embodiment of this application. A first device 102 is a terminal corresponding to a first user, and a second device 104 is a terminal corresponding to a second user. The terminal corresponding to the first user and the terminal corresponding to the second user can communicate through a network. The first device 102 may pre-process an initial speech signal obtained through recording, perform speech encoding to obtain encoded speech data, and then transmit the data. The second device 104 receives the data, performs speech decoding on the received encoded speech data, post-processes speech data obtained through decoding, and performs playing.

Specifically, after obtaining a target speech signal, the first device 102 may perform subband decomposition on the speech signal to obtain at least two subband excitation signals, perform auditory perception analysis on the subband excitation signals, and allocate different quantities of quantization bits to different subbands based on auditory perception strength. For a subband excitation signal with weak auditory perception, only a gain relative to a reference excitation signal needs to be transmitted to describe an audio feature. Thus, subband encoding may be performed by using an extremely small quantity of bits. In a decoding phase, the second device 104 may generate a restored excitation signal by multiplying the gain of the subband excitation signal by the reference excitation signal, implementing excitation reconstruction and related decoding processing in the decoding process. In this application, an encoding bit rate can be effectively reduced, bandwidths can be effectively utilized, and an effective compression ratio of signals can be increased while encoding efficiency is improved.

Figure 2:
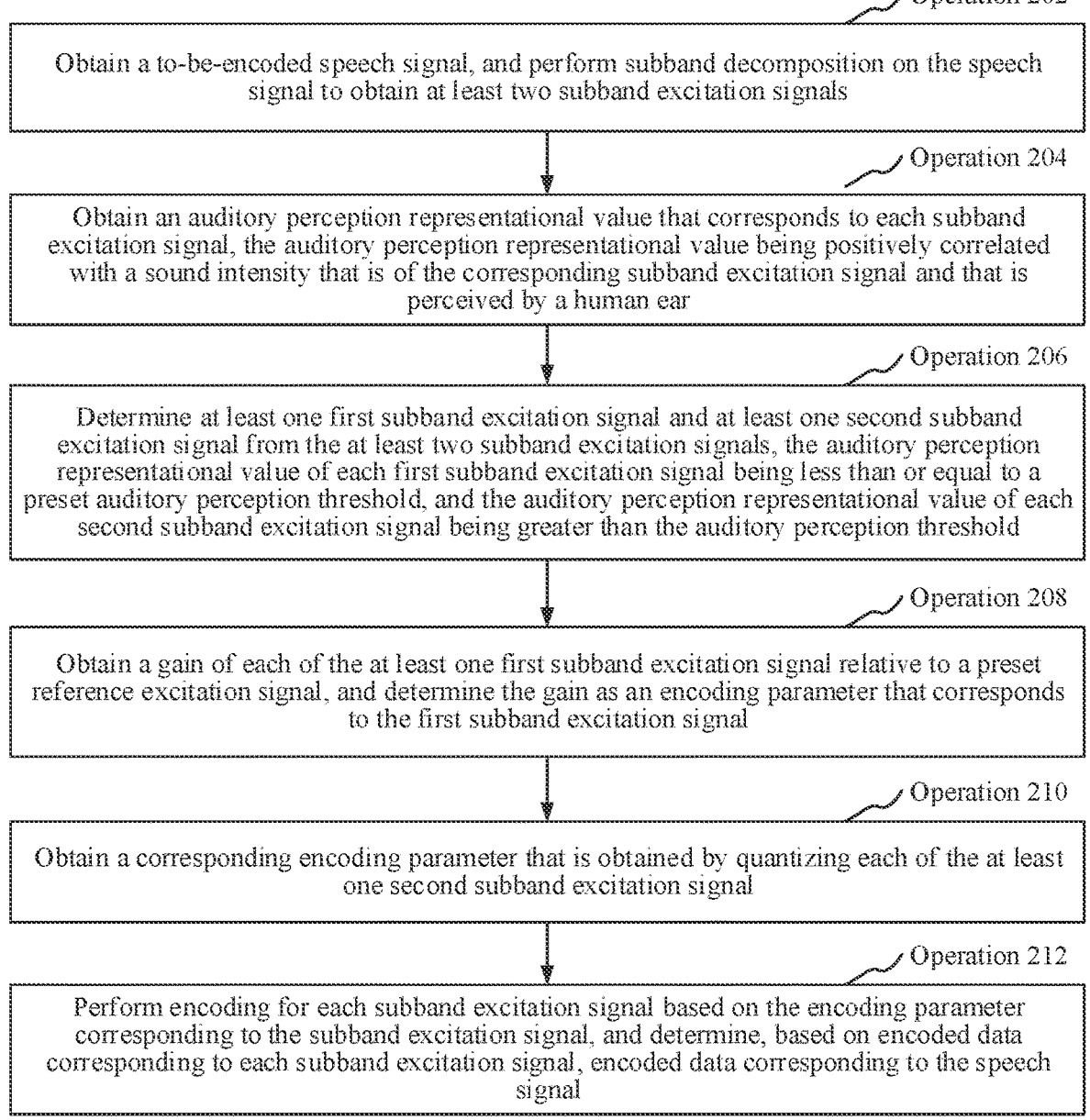
FIG. 2 is a schematic flowchart of a speech encoding method according to an embodiment.

In an embodiment, as shown in FIG. 2, a speech encoding method is provided. An example is used for description in which the method is used on the first device in FIG. 1. The method includes the following operations:

Operation 202: Obtain a target speech signal, and perform subband decomposition on the speech signal to obtain at least two subband excitation signals.

A target speech signal is a speech signal that needs to be encoded. In a specific application, a target speech signal may be a residual signal obtained by pre-processing an initial speech signal. An initial speech signal is a digital signal obtained by converting an analog signal collected by a microphone. Subband decomposition is a process of decomposing a signal into a plurality of subbands. Subband decomposition may be performed based on a frequency range of a target speech signal. Subband excitation signals obtained through the decomposition are in different frequency intervals in the frequency range. A subband excitation signal obtained through the decomposition has a narrower bandwidth than the target speech signal.

Specifically, after obtaining a to-be-encoded initial speech signal, a first device blocks the initial speech signal into a plurality of frames of speech sub-signal. A plurality of frames mean at least two frames. For each frame of speech sub-signal, the first device may perform pre-processing to obtain an initial excitation signal of the frame of speech sub-signal. The initial excitation signal is a target speech signal. For each target speech signal, the first device may perform signal subband decomposition to obtain at least two subband excitation signals.

In an embodiment, pre-processing each frame of speech sub-signal by the first device may include signal analysis and filtering, specifically including: determining, by using voice activity detection (VAD), whether the frame of speech sub-signal is a speech frame or a non-speech frame; performing high-pass filtering on a non-speech frame; further performing pitch analysis, linear prediction analysis, noise shaping analysis, and gain calculation; and performing calculation to obtain an initial excitation signal of the frame of speech sub-signal.

In an embodiment, the to-be-encoded initial speech signal obtained by the first device may be a to-be-encoded initial speech signal that is obtained after an analog-to-digital conversion circuit converts original speech that is collected by a microphone provided with the first device, or may be a speech signal that is obtained through analog-to-digital conversion and that is transmitted from another speech processing device, or may be a speech signal that is obtained through analog-to-digital conversion and that is obtained from a network. This is not limited in this application.

In an embodiment, the performing subband decomposition on the speech signal to obtain at least two subband excitation signals includes: determining a frequency range in which the speech signal is; and performing at least one level of subband decomposition on the speech signal based on the frequency range in which the speech signal is, to obtain at least two subband excitation signals, each level of subband decomposition implementing decomposition of a signal that needs to be decomposed into two signals in different frequency intervals.

Specifically, the first device may specifically use a quadrature mirror filter (QMF) to perform at least one level of symmetric subband decomposition on the target speech signal. Each level of subband decomposition implements decomposition of a signal that needs to be decomposed into two signals in different frequency intervals. After the decomposition is completed, at least two subband excitation signals are obtained.

Performing subband decomposition based on the frequency range in which the speech signal is can ensure that each subband excitation signal is in a different frequency range, implementing that speech signals in different frequency ranges are processed differently.

In another embodiment, when the at least one level of subband decomposition includes a plurality of levels of subband decomposition, the performing at least one level of subband decomposition on the speech signal based on the frequency range in which the speech signal is, to obtain at least two subband excitation signals includes: performing, at the first level of subband decomposition, subband decomposition on the speech signal based on the frequency range in which the speech signal is, to obtain a high-frequency decomposition signal and a low-frequency decomposition signal of the current level, and determining the high-frequency decomposition signal as a subband excitation signal, an arbitrary frequency in a frequency interval in which the high-frequency decomposition signal is being higher than an arbitrary frequency in a frequency interval in which the low-frequency decomposition signal is; performing, at each of the second level and following levels, and based on a frequency interval in which a low-frequency decomposition signal obtained through subband decomposition of a previous level is, subband decomposition on the low-frequency decomposition signal obtained through subband decomposition of the previous level, to obtain a high-frequency decomposition signal and a low-frequency decomposition signal of the current level; and determining, when the last level of subband decomposition is completed, a low-frequency decomposition signal obtained through subband decomposition of the last level as a subband excitation signal.

A quantity of levels of subband decomposition may be set depending on a requirement. Three levels of decomposition are used as an example. At the first level of subband decomposition, subband decomposition is performed on a speech signal based on a frequency range in which the speech signal is, to obtain a high-frequency decomposition signal and a low-frequency decomposition signal of the first level; and the high-frequency decomposition signal of the first level is determined as a subband excitation signal. At the second level of subband decomposition, the low-frequency decomposition signal of the first level continues to be decomposed based on a frequency interval in which the low-frequency decomposition signal of the first level is, to obtain a high-frequency decomposition signal and a low-frequency decomposition signal of the second level; and the high-frequency decomposition signal of the second level is determined as a subband excitation signal. At the third level of subband decomposition, the low-frequency decomposition signal of the second level continues to be decomposed based on a frequency interval in which the low-frequency decomposition signal of the second level is, to obtain a high-frequency decomposition signal and a low-frequency decomposition signal of the third level; and the high-frequency decomposition signal and the low-frequency decomposition signal of the third level are both determined as subband excitation signals.

For example, it is assumed that a frequency bandwidth of a target speech signal is 8 kHz. A high-frequency subband excitation signal ex1_high with a frequency bandwidth of 4 kHz and a low-frequency subband excitation signal ex1_low with a frequency bandwidth of 4 kHz may be obtained by using a quadrature mirror filter. The high-frequency subband excitation signal ex1_high with the frequency bandwidth of 4 kHz may be further decomposed to obtain two signals, each with a frequency bandwidth of 2 kHz: ex2_low and ex2_high. A frequency of ex2_high is higher than a frequency of ex2_low. ex2_high may continue to be decomposed to obtain two signals, each with a frequency bandwidth of 1 kHz, that is, cx3_low and ex3_high. A frequency of ex3_high is higher than a frequency of cx3_low. Finally, the target speech signal with the frequency bandwidth of 8 kHz is decomposed to obtain four subband excitation signals: exc1_low, exc2_low, exc3_high, and cxc3_low.

Because finer subband decomposition can be performed, a frequency band with weak auditory perception can be determined more accurately, further improving encoding efficiency and better utilizing broadband resources.

Operation 204: Obtain an auditory perception representational value that corresponds to each subband excitation signal, the auditory perception representational value being positively correlated with a sound intensity that is of the corresponding subband excitation signal and that is perceived by a human ear.

An auditory perception representational value may represent overall energy of an entire subband, and is configured for describing auditory perception strength of a subband excitation signal. An auditory perception representational value is positively correlated with a sound intensity that is of a corresponding subband excitation signal and that is perceived by a human ear. A larger auditory perception representational value represents stronger auditory perception of the subband excitation signal by a human ear. A smaller auditory perception representational value represents weaker auditory perception of the subband excitation signal by a human ear. In other words, the auditory perception representational value may represent an auditory perception contribution of the subband excitation signal to an entire initial speech signal. A subband excitation signal with a larger auditory perception representational value makes a larger auditory perception contribution; on the contrary, a subband excitation signal with a smaller auditory perception representational value makes a smaller auditory perception contribution. A subband excitation signal making a smaller auditory perception contribution has less impact on subjective auditory quality that exists after speech is encoded and then decoded.

Figure 3:
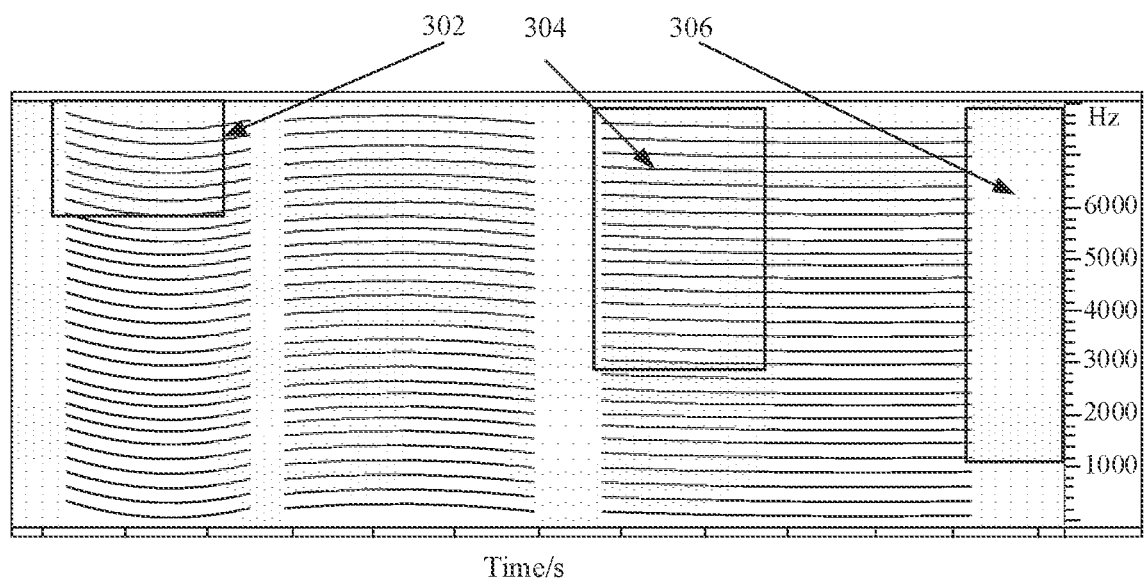
FIG. 3 is a diagram of a spectrogram according to an embodiment.

FIG. 3 shows an example of a spectrogram according to an embodiment. A horizontal coordinate in the spectrogram indicates a time, and a vertical coordinate indicates a frequency. Lines in FIG. 3 represent areas in which energy fluctuates. In FIG. 3, an arca with darker lines represents stronger auditory perception by a human car, and an area with lighter lines represents weaker auditory perception by a human car. For example, 302, 304 and 306 in FIG. 3 are all areas with weaker auditory perception. It can be learned from FIG. 3 that areas with weaker auditory perception may be distributed in various frequency bands, and have no direct relationship with a frequency. Based on this, this embodiment of this application provides the following: to quantize auditory perception strength of a subband excitation signal by determining an auditory perception representational value. Specifically, for each subband excitation signal, the first device transforms the subband excitation signal from time domain to frequency domain, obtains a feature value of each frequency point in frequency domain, and then determines, based on the feature value of each frequency point, the auditory perception representational value that corresponds to the subband excitation signal. Each frequency point may correspond to a frequency or a frequency band. For example, a subband excitation signal may include frequency points 0, 1, 2, . . . , and K−1, K frequency points in total, where K is a positive integer and indicates a total quantity of frequency points. In addition, a quantity of frequency points in a subband excitation signal, and a frequency or a frequency band corresponding to each frequency point may be set depending on an actual need. For example, more frequency points may be selected in a frequency band to which a human car is sensitive. A feature value of a frequency point is configured for describing an energy magnitude of the frequency point. A feature value of a frequency point may be, for example, an absolute power of the frequency point.

In an embodiment, the first device may obtain, for each subband excitation signal, a feature value of each frequency point in the subband excitation signal; and perform a statistical operation on the feature values of the frequency points, to obtain the auditory perception representational value that corresponds to the subband excitation signal. The statistical operation herein may be one of calculating a sum, calculating a weighted sum, calculating a mean, or calculating a median.

Operation 206: Determine at least one first subband excitation signal and at least one second subband excitation signal from the at least two subband excitation signals, the auditory perception representational value of each first subband excitation signal being less than or equal to a preset auditory perception threshold, and the auditory perception representational value of each second subband excitation signal being greater than the auditory perception threshold.

An auditory perception threshold is configured for defining a threshold of an auditory perception representational value. A human car has a specific auditory ability for a speech signal only when an auditory perception representational value of the speech signal is greater than an auditory perception threshold. As the auditory perception representational value gradually increases, auditory perception of the speech signal by the human car gradually strengthens. An auditory perception threshold may be set based on experience. During actual application, different auditory perception thresholds may be set for different quantities of FFT points. For example, in a case of a sampling rate of 16 kHz, if there are 512 FFT points, an auditory perception threshold may be set to 1000.

In a specific embodiment, the first device may compare an auditory perception representational value of each subband excitation signal with a preset auditory perception threshold. If an auditory perception representational value is less than or equal to the preset auditory perception threshold, a subband excitation signal corresponding to the auditory perception representational value is determined as a first subband excitation signal. If an auditory perception representational value is greater than the preset auditory perception threshold, a subband excitation signal corresponding to the auditory perception representational value is determined as a second subband excitation signal. There may be one or more first subband excitation signals, and likewise, there may also be one or more second subband excitation signals. More means at least two.

Operation 208: Obtain a gain of each of the at least one first subband excitation signal relative to a preset reference excitation signal, and determine the gain as an encoding parameter that corresponds to the first subband excitation signal.

A reference excitation signal is a signal configured for performing signal restoration for a corresponding first subband excitation signal in a decoding process. An amplitude of a reference excitation signal is small. For example, a reference excitation signal may be a unit excitation signal. A unit excitation signal is a signal whose absolute value of a maximum amplitude is 1, that is, a possible amplitude of the unit excitation signal is 1, 0, or −1. In some specific embodiments, the first device and a second device may agree to set a fixed reference excitation signal. In some other embodiments, the first device and the second device may agree to set a plurality of reference excitation signals. During encoding, for each first subband excitation signal, a reference excitation signal with a minimum error may be selected from the plurality of reference excitation signals to calculate a corresponding gain, and an identifier of the reference excitation signal is encoded into encoded data. Thus, during decoding, the reference excitation signal used in the encoding process can be found based on code, and restoration is performed by using the found reference excitation signal. Because the reference excitation signal used is the signal with the minimum error, distribution of the first subband excitation signal in the encoding process can be restored as much as possible, so that a signal obtained through restoration is more authentic. This improves accuracy of speech decoding. To prevent transmission of an identifier of a reference excitation signal from occupying an excessively large bandwidth, the first device and the second device usually set a small quantity of reference excitation signals. For example, four reference excitation signals may be set. In a specific implementation process, when performing decoding, the second device may multiply a reference excitation signal by a gain that is obtained based on the reference excitation signal, to obtain a restored excitation signal corresponding to a first subband excitation signal.

Specifically, for each first subband excitation signal, the first device may obtain an energy value of the first subband excitation signal, and then divide the energy value of the first subband excitation signal by an energy value of a reference excitation signal, to obtain a gain of the first subband excitation signal. A first subband excitation signal is a subband excitation signal whose auditory perception representational value is less than an auditory perception threshold. In other words, an auditory perception contribution of a first subband excitation signal to an entire initial speech signal is small or even may be ignored. Therefore, to minimize an encoding bit rate and improve encoding efficiency, in this embodiment, a gain of a first subband excitation signal relative to a preset reference excitation signal may be directly determined as an encoding parameter corresponding to the first subband excitation signal. To be specific, the first device does not quantize the first subband excitation signal, but only encodes the gain corresponding to the first subband excitation signal and transmits the encoded gain to the second device.

Operation 210: Obtain a corresponding encoding parameter that is obtained by quantizing each of the at least one second subband excitation signal.

Operation 212: Perform encoding for each subband excitation signal based on the encoding parameter corresponding to the subband excitation signal, and determine, based on encoded data corresponding to each subband excitation signal, encoded data corresponding to the speech signal.

Specifically, the first device may quantize each second subband excitation signal to obtain a quantized excitation signal of each second subband excitation signal. The first device may further determine an encoding parameter of the second subband excitation signal based on the quantized excitation signal. For example, the quantized excitation signal may be directly determined as an encoding parameter, or a value that can identify the quantized excitation signal may be used as an encoding parameter. In some embodiments, an encoding parameter of a second subband excitation signal may further include a gain of the second subband excitation signal.

The first device may further compress and encode the encoding parameter of each subband excitation signal and another encoding parameter that is obtained through calculation during pre-encoding processing, and encapsulate the encoded data into a data packet. The data packet is the encoded data corresponding to the target speech signal. In different encoding modes, the another encoding parameter that is obtained through calculation is different. For example, in a SILK encoder, the another encoding parameter may include a gain of a second subband excitation signal, a VAD parameter, a linear spectral frequency, a pitch parameter, or the like.

In an embodiment, a second subband excitation signal may be quantized by using vector quantization. For example, for a second subband excitation signal, a preset codebook may be searched for a codebook vector with a minimum quantization error, and the codebook vector is used as a quantized excitation signal of the second subband excitation signal. Thus, a codebook address, configured for identifying the quantized excitation signal, in the codebook may be used as a corresponding encoding parameter of the second subband excitation signal. A codebook address may be a specific value. For example, it is assumed that 32 codebook vectors exist in a preset codebook. Values 0 to 31 may be used as codebook addresses to identify the codebook vectors, respectively. In some other embodiments, a subband excitation signal may be alternatively quantized in another quantization mode. For example, quantization may be alternatively performed in a scalar quantization mode. A specific quantization mode is not limited in this application.

In an embodiment, in consideration that auditory perception representational values of different second subband excitation signals may be different, that is, various second subband excitation signals make different auditory perception contributions, the first device may quantize the various second subband excitation signals differently. A subband excitation signal with a larger auditory perception representational value is quantized with higher quantization precision, whereas a subband excitation signal with a smaller auditory perception representational value may be quantized with lower quantization precision, so as to allocate encoding bandwidths properly. In a specific application, the first device may perform value interval division for auditory perception representational values in advance, and set a corresponding gain for each value interval obtained through division. During quantization, a gain corresponding to a value interval in which an auditory perception representational value corresponding to a second subband excitation signal is determined as a gain corresponding to the second subband excitation signal. Then, quantization encoding is performed on the second subband excitation signal based on the gain. A value interval with smaller values corresponds to a larger gain.

In the foregoing speech encoding method, the at least one first subband excitation signal and the at least one second subband excitation signal are determined from the at least two subband excitation signals, and the auditory perception representational value of each first subband excitation signal is less than or equal to the preset auditory perception threshold. Therefore, a sound intensity that is of the first subband excitation signal and that is perceived by a human ear is weak. The human ear cannot clearly perceive whether the first subband excitation signal is accurately encoded. Therefore, the first subband excitation signal may not be quantized, and the gain relative to the preset reference excitation signal is obtained and used as an encoding parameter, so as to reduce a quantity of subbands that need to be quantized in the encoding process, and improve encoding efficiency. In addition, because only a gain needs to be encoded for a subband with weak auditory perception, a quantity of parameters that need to be encoded decreases. Thus, an encoding bit rate can be effectively reduced, bandwidths can be better utilized, and an effective compression ratio of signals can be increased.

In an embodiment, the feature value of a frequency point is an absolute power, and the performing a statistical operation on the feature values of the frequency points, to obtain the auditory perception representational value that corresponds to the subband excitation signal includes: obtaining an auditory perception coefficient of each frequency point in the subband excitation signal, the auditory perception coefficient being positively correlated with an auditory loudness level, and the auditory loudness level being configured for describing a loudness level of sound; and calculating a weighted sum of absolute powers of the frequency points in the subband excitation signal based on the auditory perception coefficients of the frequency points, to obtain the auditory perception representational value that corresponds to the subband excitation signal.

Figure 4:
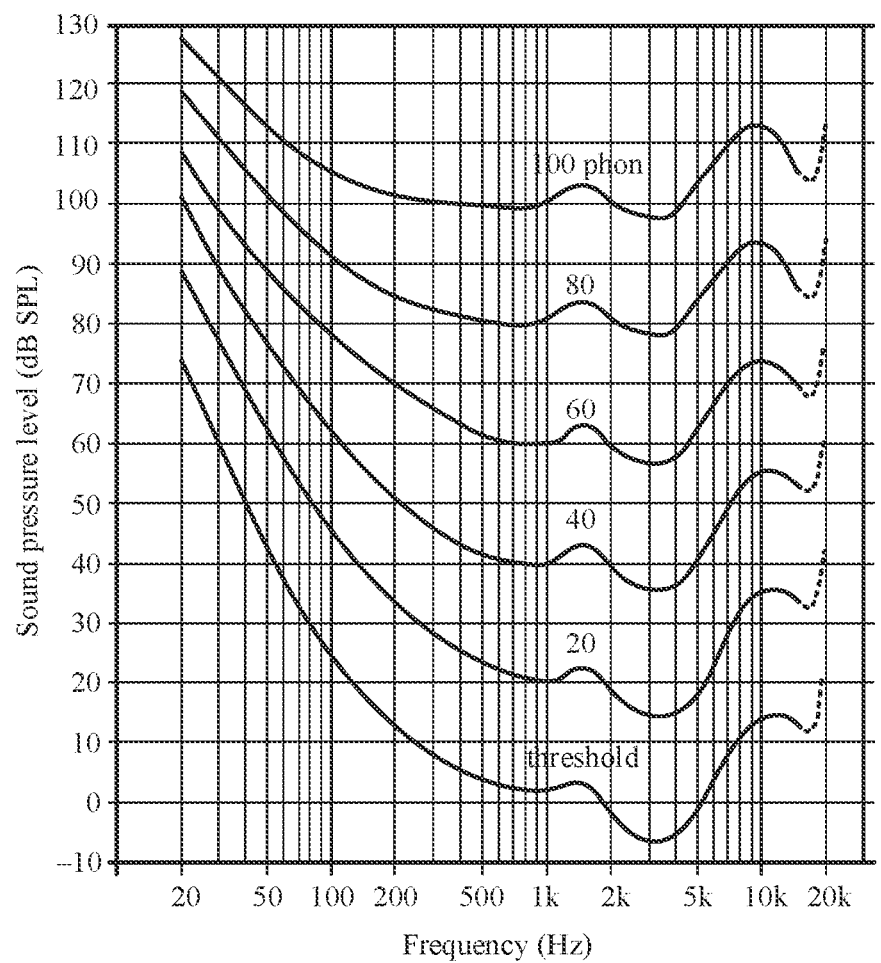
FIG. 4 is a diagram of acoustic equal-loudness level contours according to another embodiment.

A main basis of psychological auditory perception is an auditory loudness level. An auditory loudness level is also referred to as a loudness level for short, and is configured for indicating how loud sound sounds. In other words, a sound intensity is referred to as a loudness level. A loudness level is configured for describing a loudness level of sound and indicates a subjective perception of the sound by a human ear. A loudness level varies with a sound intensity, but is also affected by a frequency. To be specific, for sound of the same intensity but at different frequencies, a human ear has different auditory perceptions. FIG. 4 is a diagram of acoustic equal-loudness level contours determined by an international organization for acoustics standards. The diagram of the acoustic equal-loudness level contours is used for illustrating relationships between sound pressure levels and sound wave frequencies for a condition of equal loudness levels. To be specific, curves that illustrate relationships between sound pressure levels and sound wave frequencies for a condition of equal loudness levels are referred to as equal-loudness level contours, which are one of important auditory features. In other words, the diagram of the acoustic equal-loudness level contours shows sound pressure levels that pure tones at different frequencies need to reach to achieve an equal auditory loudness level for a human ear.

The following uses an example to describe a meaning of the contours. Based on the foregoing description, it can be learned that an equal-loudness level contour is a curve formed by connecting sound pressure levels at which pure tones at various frequencies are when reaching an equal loudness level. As shown in FIG. 4, in the diagram of the acoustic equal-loudness level contours, a horizontal coordinate represents frequencies of the pure tones, and a vertical coordinate represents sound pressure levels that need to be reached to achieve each loudness level. For any equal-loudness level contour in FIG. 4, to reach an equal loudness level, a higher sound pressure level (energy) is required for a lower frequency in low-frequency and medium-frequency ranges (below 1 kHz). In other words, greater sound energy is required to achieve the same auditory perception for a human ear. For medium and high frequencies (above 1 kHz), different frequency bands have different acoustic auditory perception features.

Based on this, in this application, an auditory perception representational value may be calculated by obtaining an auditory perception coefficient. An auditory perception coefficient is positively correlated with an auditory loudness level. Therefore, an auditory perception coefficient of each frequency point in frequency domain may be configured for describing a degree to which a human ear is sensitive to sound at each frequency point.

Specifically, the first device may transform each subband excitation signal from time domain to frequency domain by using fast Fourier transform, to obtain a Fourier transform result, that is, a corresponding spectrum graph. After that, an absolute power of each frequency point can be calculated based on an amplitude corresponding to the frequency point in the spectrum graph. An absolute power is an absolute power of a frequency point. An absolute power of each frequency point in an $i^{th}$ frame may be expressed as p(i, j), j=0~k−1, where k is a total quantity of frequency points.

Further, the first device may multiply the absolute powers of the frequency points by different auditory perception weighting coefficients, and add the products together to obtain an auditory perception representational value of the subband excitation signal. For specific information, refer to the following formula (1):

$$EBP = (1/(kbup(m) - kbdw(m))) * \sum_{k=kbdw(m)}^{k=kbup(m)} p(i, j) * conf(k)$$

In the formula, EBP is an auditory perception representational value, i is a frame number, k is a frequency point number, m is a subband number, kbup(m) and kbdw(m) respectively represent numbers of upper- and lower-limit frequency points in an $m^{th}$ subband, and conf(k) is an auditory perception coefficient of a $k^{th}$ frequency point.

In this embodiment, impact of an auditory loudness level on auditory perception is taken into full consideration. Auditory perception is quantized by calculating a weighted sum of the absolute powers of the frequency points based on the auditory perception coefficients, where the auditory perception coefficients are positively correlated with auditory loudness levels. Therefore, the obtained auditory perception representational value can more accurately describe auditory perception strength.

In an embodiment, the obtaining an auditory perception coefficient of each frequency point in the subband excitation signal includes: obtaining preset acoustic equal-loudness level contours data, the acoustic equal-loudness level contours data being configured for describing relationships between sound pressure levels and frequencies for a condition of equal loudness levels; performing, for each frequency point in the subband excitation signal, linear interpolation on the preset acoustic equal-loudness level contours data based on a frequency of the frequency point, to obtain a sound pressure level of the frequency point; and determining a loudness level of the frequency point based on the sound pressure level of the frequency point and according to preset mapping relationships between sound pressure levels and loudness levels, and determining the auditory perception coefficient of the frequency point based on the loudness level, the auditory perception coefficient being positively correlated with the loudness level.

Specifically, an auditory perception coefficient may be determined with reference to acoustic equal-loudness level contours data. In a specific application process, an auditory perception coefficient may be calculated based on acoustic equal-loudness level contours data in BS 3383 Specification for normal equal-loudness level contours for pure tones under free-field listening conditions (BS3383 specification). The first device may perform interpolation on the acoustic equal-loudness level contours data by using a linear interpolation method, so as to obtain an auditory loudness level of each frequency point. For specific information, refer to the following formula (2) to formula (5):

$$afy = af(j-1) + \qquad\qquad \text{formula (2)}$$
$$(freq - ff(j-1)) \times (af(j) - af(j-1))/(ff(j) - ff(j-1))$$
$$bfy = bf(j-1) + \qquad\qquad \text{formula (3)}$$
$$(freq - ff(j-1)) \times (bf(j) - bf(j-1))/(ff(j) - ff(j-1))$$
$$cfy = cf(j-1) + \qquad\qquad \text{formula (4)}$$
$$(freq - ff(j-1)) \times (cf(j) - cf(j-1))/(ff(j) - ff(j-1))$$
$$loud = 4.2 + afy \times (dB - cfy)/(1 + bfy \times (dB - cfy)) \qquad \text{formula (5)}$$

In the formulas, freq is a frequency corresponding to a frequency point for which an auditory perception coefficient needs to be calculated, and j is a frequency point number in an equal-loudness level contours data table, where each frequency point number in the equal-loudness level contours data table corresponds to a frequency, and freq is not greater than a frequency corresponding to the frequency point number j in the equal-loudness level contours data table, and is not less than a frequency corresponding to a frequency point number j−1; ff(j) is the frequency of the frequency point number j, ff(j−1) is the frequency of the frequency point number j−1, and af, bf, and cf respectively represent sound pressure values on different contours, where ff, af, bf, and cf may be obtained by looking up in the equal-loudness level contours data table disclosed in BS 3383 Specification for normal equal-loudness level contours for pure tones under free-field listening conditions (BS3383 specification);

loud is an auditory loudness level of the frequency point for which an auditory perception coefficient needs to be calculated; and dB is a preset value, which may be, for example, 60.

After the auditory loudness level of each frequency point is obtained through calculation, the first device may further calculate the auditory perception coefficient with reference to the following formula (6):

$$cof(freq) = (10^{\wedge}loud/20)/1000 \qquad \text{formula (6)}$$

Figure 5:
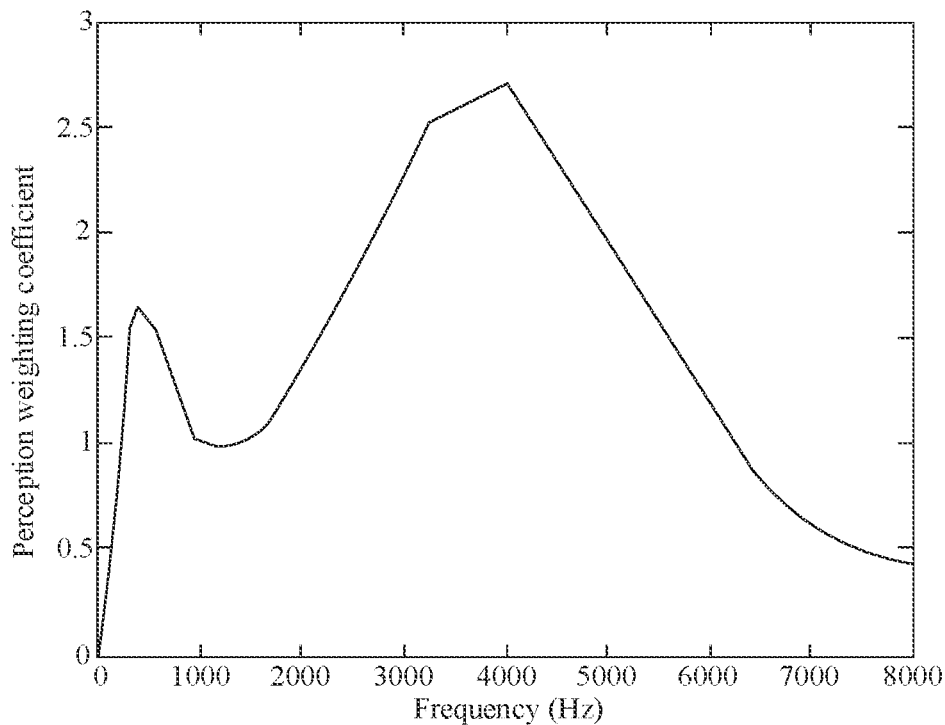
FIG. 5 is a diagram of auditory perception coefficients according to an embodiment.

In the formula, cof(freq) is an auditory perception coefficient corresponding to the frequency point for which an auditory perception coefficient needs to be calculated. FIG. 5 is a diagram of auditory perception coefficients. FIG. 5 shows correspondences between frequencies and auditory perception coefficients of frequency points.

In the foregoing embodiment, the auditory loudness level of each frequency point is obtained by performing linear interpolation on the acoustic equal-loudness level contours data. Then, the auditory perception coefficient of each frequency point is determined based on the auditory loudness level of each frequency point. Because the acoustic equal-loudness level contours data is configured for describing relationships between sound pressure levels and sound wave frequencies for a condition of equal loudness levels, accurate auditory perception coefficients can be obtained.

In an embodiment, the obtaining a gain of each of the at least one first subband excitation signal relative to a preset reference excitation signal includes: obtaining, for each first subband excitation signal, an energy value corresponding to the first subband excitation signal, the energy value being positively correlated with amplitudes of sampling points of the first subband excitation signal in time domain; obtaining an energy value corresponding to the preset reference excitation signal; and determining the gain of the first subband excitation signal relative to the reference excitation signal based on a ratio of the energy value corresponding to the first subband excitation signal to the energy value corresponding to the reference excitation signal.

Specifically, for each first subband excitation signal, the first device may calculate a sum of squares of the amplitudes of the sampling points of the first subband excitation signal to obtain the energy value corresponding to the first subband excitation signal, further obtain the energy value corresponding to the reference excitation signal, and divide the energy value corresponding to the first subband excitation signal by a preset energy value to obtain the gain of the first subband excitation signal relative to the reference excitation signal. Then, in the decoding phase, the second device may multiply the gain by the reference excitation signal to restore the first subband excitation signal. The gain of the first subband excitation signal is determined by calculating the ratio of the energy value corresponding to the first subband excitation signal to the energy value corresponding to the reference excitation signal. In this way, the gain can be calculated quickly, improving efficiency of gain calculation.

In an embodiment, when the at least one second subband excitation signal includes a plurality of second subband excitation signals, the obtaining a corresponding encoding parameter that is obtained by quantizing each of the at least one second subband excitation signal includes: sorting the plurality of second subband excitation signals in descending order of the corresponding auditory perception representational values, to obtain a sorting result; and quantizing the plurality of second subband excitation signals differently based on their respective ordinal positions in the sorting result, to obtain the encoding parameters corresponding to the plurality of second subband excitation signals.

Quantization precision is accuracy of quantizing an excitation signal to obtain a quantized signal. Quantizing a subband excitation signal is a process of using discrete values to represent a subband excitation signal, so as to reduce bits required for transmitting the subband excitation signal. Higher quantization precision indicates a smaller error between the obtained quantized signal and the excitation signal, and also indicates higher accuracy of the obtained quantized signal. In different implementations, quantization precision may be represented in different ways. For example, quantization precision may be represented by a quantization error in a quantization process. A larger quantization error indicates lower quantization precision. A quantization error is a cost that is caused or a distortion that occurs when a subband excitation signal is restored based on a quantized excitation signal.

Specifically, the first device may sort the second subband excitation signals in descending order of the auditory perception representational values, to obtain the sorting result; and quantize the plurality of second subband excitation signals differently based on their respective ordinal positions in the sorting result, to obtain the encoding parameters corresponding to the plurality of second subband excitation signals.

Quantization precision with which the plurality of second subband excitation signals are quantized separately to obtain quantized signals decreases in the sorting order in the sorting result. For example, it is assumed that a frame of speech sub-signal is decomposed into four subband excitation signals, which are a subband excitation signal A, a subband excitation signal B, a subband excitation signal C, and a subband excitation signal D. The subband excitation signal D is a first subband excitation signal. There are three second subband excitation signals, which are the subband excitation signal A, the subband excitation signal B, and the subband excitation signal C. An auditory perception representational value of the subband excitation signal A is X, an auditory perception representational value of the subband excitation signal B is Y, and an auditory perception representational value of the subband excitation signal C is Z. It is assumed that X>Y>Z. During quantization encoding, quantization precision for the subband excitation signal A is the highest, quantization precision for the subband excitation signal B is the second highest, and quantization precision for the subband excitation signal C is the lowest.

In another specific embodiment, quantization precision for at least one of the second subband excitation signals is lower than quantization precision for the other second subband excitation signals, and the second subband excitation signal follows the other second subband excitation signals. For example, in the foregoing example, the subband excitation signal A and the subband excitation signal B have the same quantization precision, which is higher than the quantization precision for the subband excitation signal C.

In different applications, the first device may control quantization precision in different ways. In an embodiment, the first device may control quantization precision by adjusting a gain. A larger gain indicates lower quantization precision. In another embodiment, the first device may alternatively control quantization precision by using different sizes of codebooks. A selected codebook of a larger size indicates higher quantization precision, and a selected codebook of a smaller size indicates lower quantization precision. When a codebook is of a smaller size, a codebook address corresponding to each codebook vector in the codebook is a smaller value. Therefore, a smaller quantity of bits may be used for encoding. For example, the first device and the second device may set three codebooks. The codebooks are: a codebook 1 with a codebook size of 50, a codebook 2 with a codebook size of 100, and a codebook 3 with a codebook size of 150. For the foregoing example, the subband excitation signal A may be quantized by using the codebook 3, the subband excitation signal B may be quantized by using the codebook 2, and the subband excitation signal C may be quantized by using the codebook 1. Codebook addresses for the codebook 1 are values from 1 to 50, codebook addresses for the codebook 2 are values from 1 to 100, and codebook addresses for the codebook 3 are values from 1 to 150. Apparently, among quantities of bits that are required for encoding the codebook addresses of the codebooks, the quantity of bits required by the codebook 3 is the largest, that required by the codebook 2 is the second largest, and that required by the codebook 1 is the smallest.

In the foregoing embodiment, a subband excitation signal with a larger auditory perception representational value may be encoded with higher quantization precision, and a subband excitation signal with a smaller auditory perception representational value may be encoded with lower quantization precision. When quantization precision is lower, there are a few signal details, and therefore, the signal details may be described by using a fewer bits. This further improves encoding efficiency, and better implements proper allocation of encoding bandwidths.

In an embodiment, the quantizing the plurality of second subband excitation signals differently based on their respective ordinal positions in the sorting result, to obtain the encoding parameters corresponding to the plurality of second subband excitation signals includes: determining, for the plurality of second subband excitation signals, their respective corresponding gains based on their respective ordinal positions in the sorting result, the gains respectively corresponding to the second subband excitation signals increasing in the sorting order in the sorting result; and quantizing each second subband excitation signal based on the gain corresponding to the second subband excitation signal, to obtain a quantized excitation signal of the second subband excitation signal, the gains respectively corresponding to the second subband excitation signals increasing in the sorting order in the sorting result.

Specifically, in consideration that a quantization error is obtained based on a difference between a restored quantized signal and a subband excitation signal, and the restored quantized signal may be obtained by multiplying a gain in the encoding process by a quantized signal, the first device may adjust quantization precision by controlling the gains of the second subband excitation signals. For example, if a gain is increased, quantization precision is decreased; on the contrary, if a gain is decreased, quantization precision is increased. When a gain is increased, a dynamic range of a signal is narrowed, resulting in that a small signal change cannot be accurately measured and signal details are reduced. Therefore, during encoding, a smaller quantity of bits may be used for description. Based on this, in this embodiment, the first device may adjust, for the plurality of second subband excitation signals based on their respective ordinal positions in the sorting result, an initial gain to determine their respective corresponding gains, so that a gain of a second subband excitation signal in a lower position in the sorting result increases.

After determining the gain of each second subband excitation signal, the first device may quantize each second subband excitation signal based on the gain of each second subband excitation signal, to obtain the quantized excitation signal of each second subband excitation signal. Quantization includes but is not limited to vector quantization or scalar quantization. Vector quantization is used as an example. In some embodiments, the first device may search, for each second subband excitation signal, one or more preset codebooks for a codebook vector. Every time a codebook vector is found, the codebook vector is multiplied by the gain of the second subband excitation signal, to calculate a quantization error. A codebook address corresponding to a codebook vector with a minimum quantization error is used as a quantized excitation signal of the second subband excitation signal.

In the foregoing embodiment, through control over the gain of each subband excitation signal, quantization encoding with different quantization precision can be implemented accurately and quickly in a quantization process, further improving encoding efficiency.

In an embodiment, the determining, for the plurality of second subband excitation signals, their respective corresponding gains based on their respective ordinal positions in the sorting result includes: obtaining an initial gain, the initial gain being determined based on a to-be-encoded initial speech signal, and the target speech signal being obtained after the initial speech signal is processed before being encoded; determining the initial gain as the gain of the second subband excitation signal that is in the first position in the sorting result; and performing increasing based on the initial gain, to determine the gains corresponding to the second subband excitation signals that are in the second and following positions in the sorting result, the initial gain being configured for being encoded into the encoded data, so that the gain corresponding to each second subband excitation signal is determined based on the initial gain during decoding.

The first device may directly use a gain obtained through calculation based on the initial speech signal, as the initial gain; or use a gain that is obtained by slightly adjusting the gain obtained through calculation, as the initial gain.

In a specific embodiment, the first device and the second device may agree on a gain increasing mode. The gain increasing mode may be, for example, differential increasing. For example, second subband excitation signals include three subband excitation signals. A first preset increasing mode is shown in Table 1. Serial numbers 1, 2, and 3 respectively represent the three subband excitation signals included in the second subband excitation signals. A larger serial number indicates that a subband excitation signal represented by the serial number is in a lower position. A gain multiple corresponding to a serial number is configured for representing a multiple of a gain of a subband excitation signal represented by the serial number relative to an initial gain. With reference to Table 1, for the three second subband excitation signals in the foregoing example, a subband excitation signal A, a subband excitation signal B, and a subband excitation signal C, the first device may allocate the initial gain to the subband excitation signal A, allocate (the initial gain×1.1) to the subband excitation signal B, and allocate (the initial gain×1.2) to the subband excitation signal C.

TABLE 1

| Serial number | Gain multiple |
| --- | --- |
| 1 | 1 |
| 2 | 1.1 |
| 3 | 1.2 |

The gain multiples in Table 1 may alternatively be other values, for example, may be 1, 1.2, 1.4, and 1.6. The increasing mode in this embodiment may alternatively be another increasing mode, provided that a specific difference rule is met. This is not limited in this application.

The gains of the second subband excitation signals sequentially increase in a preset gain increasing mode. Therefore, in the encoded data that is obtained after the first device performs encoding, the encoding parameters of the second subband excitation signals may be sorted based on the ordinal positions of the corresponding second subband excitation signals. In addition, for the encoded data, only the initial gain is transmitted. In the decoding process, the second device may calculate, based on the ordinal positions and the initial gain, a gain required for each quantized excitation signal, to restore the speech signal. In this way, because only the initial gain needs to be transmitted, a quantity of bits required for encoding is further reduced, and encoding bandwidths are significantly decreased. For example, for the subband excitation signal A, the subband excitation signal B, and the subband excitation signal C in the foregoing example, an encoding parameter of the subband excitation signal A may be encoded first, then an encoding parameter of the subband excitation signal B may be encoded, and finally an encoding parameter of the subband excitation signal C may be encoded in an encoding process. Thus, during decoding at a decoding end, the subband excitation signal A is decoded first, and a gain of the subband excitation signal A is determined as the initial gain; then the subband excitation signal B is decoded, and a gain of the subband excitation signal B is determined as the initial gain×1.1; finally, the subband excitation signal C is decoded, and a gain of the subband excitation signal C is determined as the initial gain×1.2. Certainly, in some other embodiments, the first device may alternatively encode serial numbers of the second subband excitation signals in the encoding process. Thus, during the decoding, the second device can determine gains based on correspondences between the serial numbers and gain multiples.

Figure 6:
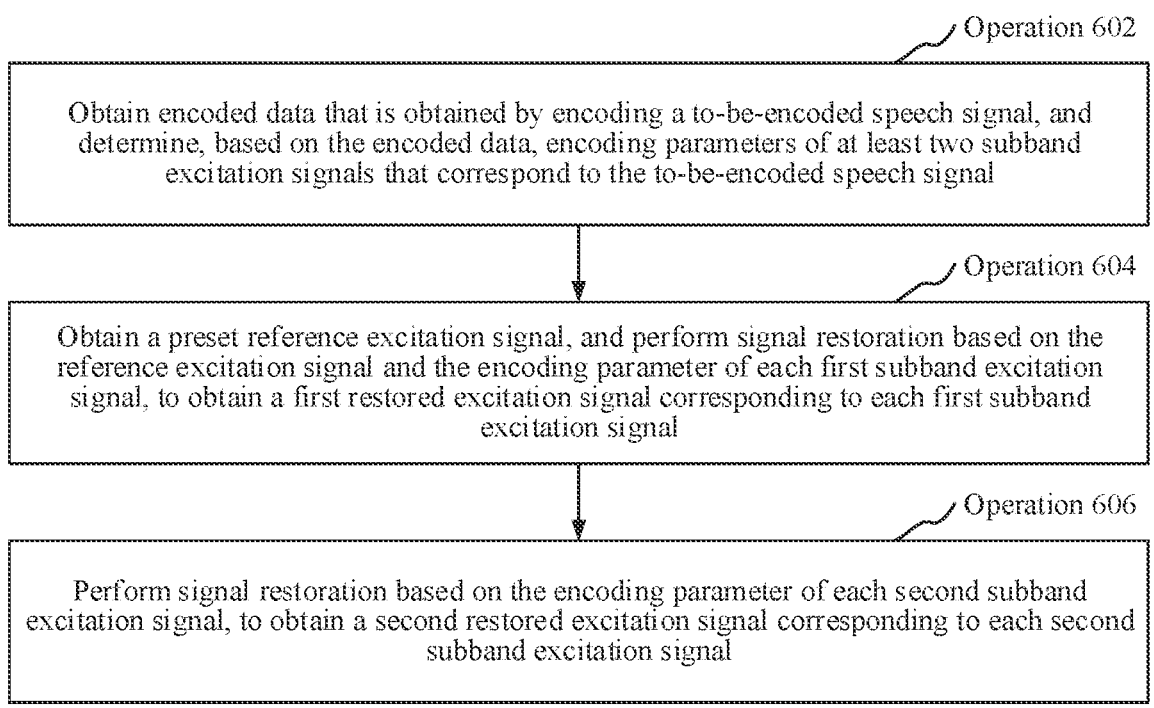
FIG. 6 is a schematic flowchart of a speech decoding method according to an embodiment.

In an embodiment, as shown in FIG. 6, a speech decoding method is provided. An example is used for description in which the method is used on the second device in FIG. 1. The method includes the following operations:

Operation 602: Obtain encoded data that is obtained by encoding a target speech signal, and determine, based on the encoded data, encoding parameters of at least two subband excitation signals that correspond to the target speech signal.

The at least two subband excitation signals include at least one first subband excitation signal and at least one second subband excitation signal. An auditory perception representational value of each first subband excitation signal is less than or equal to a preset auditory perception threshold. An auditory perception representational value of each second subband excitation signal is greater than the auditory perception threshold. The auditory perception representational value is positively correlated with a sound intensity that is of the corresponding subband excitation signal and that is perceived by a human ear.

The encoded data herein is obtained after a first device performs encoding. For specific information, refer to the description in the foregoing embodiment.

Operation 604: Obtain a preset reference excitation signal, and perform signal restoration based on the reference excitation signal and the encoding parameter of each first subband excitation signal, to obtain a first restored excitation signal corresponding to each first subband excitation signal.

Operation 606: Perform signal restoration based on the encoding parameter of each second subband excitation signal, to obtain a second restored excitation signal corresponding to each second subband excitation signal.

An amplitude of a reference excitation signal is small herein. For example, a reference excitation signal may be a unit excitation signal. To be specific, a reference excitation signal is obtained by randomly combining 1, 0, and −1, and may be, for example, (1, −1, 0, 1, 0). A quantity of sampling points included in a reference excitation signal is the same as a quantity of sampling points included in a subband excitation signal.

Specifically, a second device multiplies a reference excitation signal by a gain to implement signal restoration and obtain a first restored excitation signal. The second device may also perform signal restoration based on a quantized excitation signal, to obtain a second restored excitation signal. In a specific application, the encoded data may alternatively be parsed to obtain a gain corresponding to a quantized excitation signal. The second device may search a codebook for a corresponding codebook vector based on the quantized excitation signal, and multiply the codebook vector by the gain corresponding to the quantized excitation signal, to obtain a second restored excitation signal through restoration.

Operation 608: Perform signal subband synthesis based on each first restored excitation signal and each second restored excitation signal, to obtain a restored speech signal.

Signal subband synthesis is a reverse process of signal subband decomposition. In an embodiment, the second device may perform signal subband synthesis by using a quadrature mirror filter.

Specifically, the second device performs signal subband synthesis based on the first restored excitation signal and the second restored excitation signal, to obtain the restored speech signal. The second device further continues to perform subsequent post-processing on the restored speech signal, for example, long-term filtering and short-term filtering, to obtain a speech signal that can be used for playing.

According to the foregoing speech decoding method, signal restoration may be performed based on a reference excitation signal and a gain, to obtain a first restored excitation signal; signal restoration may be performed based on a quantized excitation signal, to obtain a second restored excitation signal; and signal subband synthesis may be performed based on the first restored excitation signal and the second restored excitation signal. Therefore, an accurate speech signal can be restored through decoding.

Figure 7:
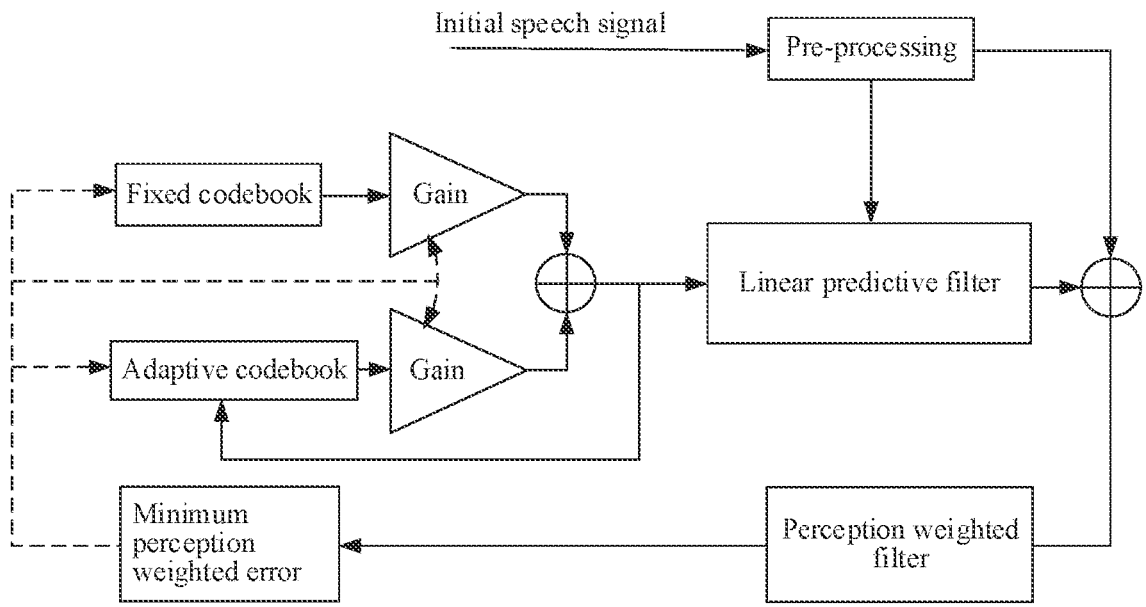
FIG. 7 is a diagram of an encoding process of a CELP coding technology according to an embodiment.

In a specific embodiment, the encoding method in this application may be used on a coding technology that is based on code excited linear prediction (CELP). The CELP coding technology is an effective technology for compressing and coding speech at low and medium bit rates. This technology uses a codebook as an excitation source, and has advantages such as a low bit rate, high-quality synthesized speech, and a strong anti-noise capability. This technology is widely used on bit rates from 4.8 kbps to 16 kbps. At present, speech encoders using the CELP technology include G.723, G.728, G.729, and G.722.2 encoders, and the like. FIG. 7 is a flowchart of encoding by using a CELP coding technology. With reference to FIG. 7, after pre-processing such as high-pass filtering is performed on an initial speech signal, linear predictive coding (LPC) parameters are obtained through LPC. The LPC parameters are a group of linear predictive filtering coefficients. The LPC parameters are converted into LSP parameters and quantized. Predictive filtering is performed based on the LPC parameters. A difference between the initial speech signal and an LPC predictive filtering result is an initial excitation signal. The initial excitation signal is a residual signal. An adaptive codebook parameter of the residual signal is obtained based on an adaptive codebook and through analysis and search of open-loop pitch and closed-loop pitch. Then, quantization encoding is performed based on a fixed codebook by using the speech encoding method provided in this embodiment of this application, to obtain a fixed codebook parameter. Specifically, one level or a plurality of levels of subband decomposition are performed on the residual signal, to obtain a plurality of subband excitation signals in different frequency ranges. An auditory perception representational value of each subband excitation signal is calculated based on an absolute power of each frequency point in the subband excitation signal. Then, for a first subband excitation signal whose auditory perception representational value is less than or equal to an auditory perception threshold, a gain of the first subband excitation signal relative to a reference excitation signal is determined, and the gain is determined as an encoding parameter corresponding to the first subband excitation signal. For a plurality of second subband excitation signals whose auditory perception representational values are greater than the auditory perception threshold, the second subband excitation signals are sorted in descending order of the auditory perception representational values. Based on ordinal positions, quantization is performed by using fixed codebooks of different sizes, to obtain corresponding encoding parameters. A codebook of a smaller size may be used for a second subband excitation signal with a smaller auditory perception representational value, whereas a codebook of a larger size may be used for a second subband excitation signal with a larger auditory perception representational value. In this way, the second subband excitation signal with a larger auditory perception representational value can be quantized with higher quantization precision, whereas the second subband excitation signal with a smaller auditory perception representational value can be quantized with lower quantization precision.

The first device further calculates a gain parameter of the adaptive codebook and a gain parameter of each fixed codebook, encapsulates and packages the encoding parameters obtained in the encoding process, and transmits the encoding parameters to a decoding end through a channel. A size of a codebook is configured for indicating a quantity of codebook vectors included in the codebook. A larger size of a codebook indicates a larger quantity of codebook vectors included in the codebook. Therefore, corresponding quantization precision is higher. For example, it is assumed that a codebook Y includes five codebook vectors: Y1, Y2, Y3, Y4, and Y5. In this case, a size of the codebook is 5.

Figure 8:
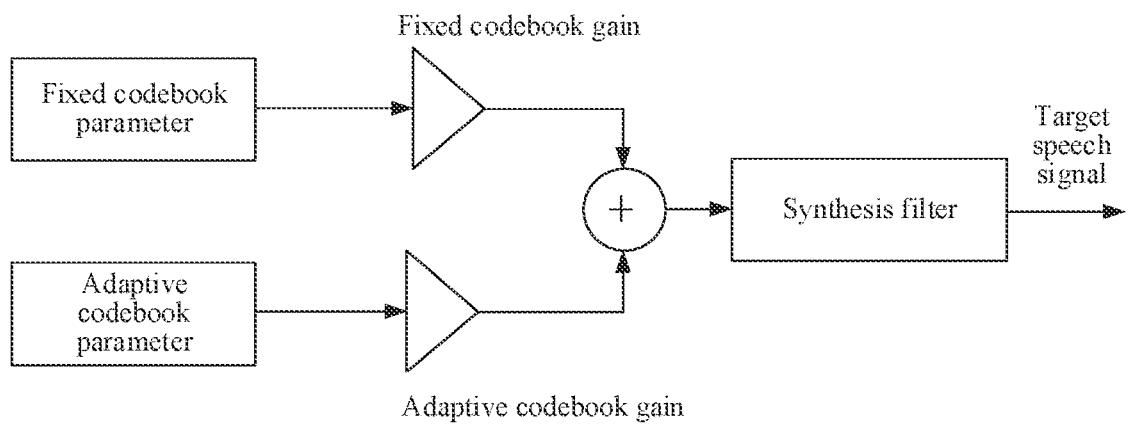
FIG. 8 is a diagram of a decoding process of a CELP coding technology according to an embodiment.

FIG. 8 is a flowchart of decoding by using a CELP coding technology. At a decoding end, received encoded data packets are parsed to obtain all encoding parameters, interpolation is performed on LSP parameters to obtain LPC filtering coefficients, each quantized excitation signal in fixed codebook parameters is multiplied by a fixed codebook gain of the quantized excitation signal to implement signal restoration, a gain is multiplied by a reference excitation signal to implement signal restoration, and then signal subband synthesis is performed on restored excitation signals obtained through restoration, to obtain a synthesized excitation signal. An adaptive codebook parameter is multiplied by an adaptive codebook gain to generate an adaptive codebook excitation signal. A sum of the adaptive codebook excitation signal and the synthesized excitation signal is filtered by an LPC synthesis filter, and post-processing is performed, to obtain a final speech signal that is used for playing.

Figure 9:
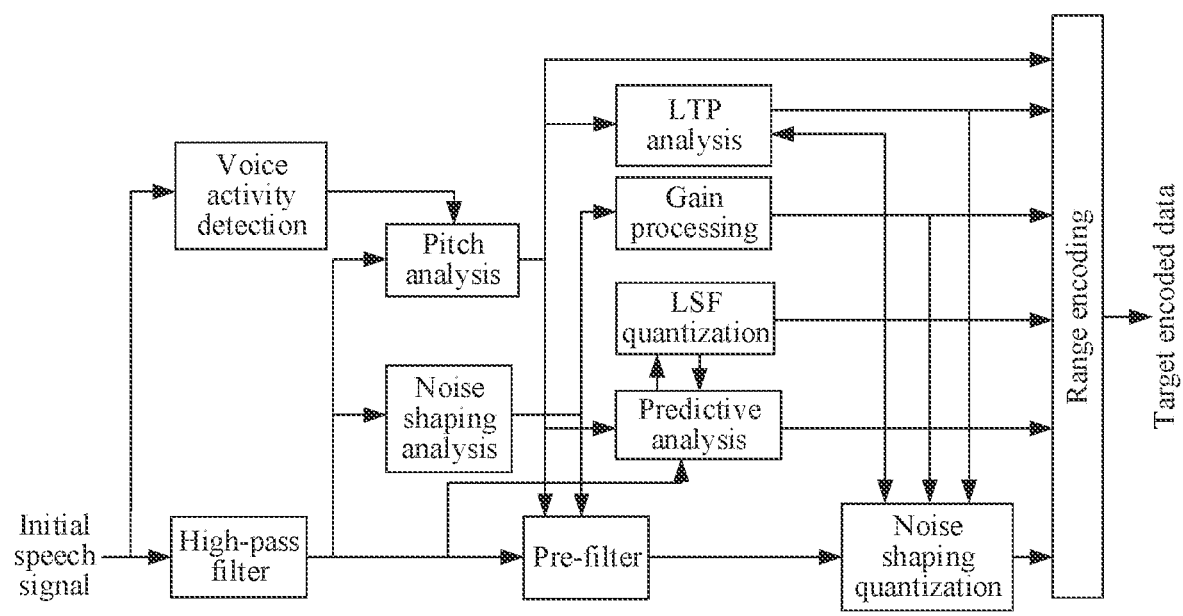
FIG. 9 is a diagram of an encoding process of a SILK encoder according to an embodiment.

In an embodiment, the encoding method in this application may be used on a SILK-based coding technology. A SILK speech encoder is a variant of a CELP model. A main improvement of the SILK speech encoder is that noise shaping is introduced to make a frequency spectrum of a residual excitation signal smoother, further increasing a quantization signal-to-noise ratio of excitation. FIG. 9 is a diagram of an encoding process of a SILK encoder. First, VAD processing and high-pass filtering are performed on an input speech signal. Noise shaping analysis is performed on an output signal of high-pass filtering. A gain and a filter coefficient that are to be used in a pre-filter and noise shaping quantization are obtained through noise shaping analysis. Pitch analysis is performed on an output signal of VAD processing, to make an unvoiced/voiced decision. A pitch period of a voiced signal is estimated to obtain a pitch autocorrelation coefficient and a pitch delay. LTP analysis is performed an output signal of pitch analysis. Pre-filtering is performed on an output of noise shaping analysis. Predictive analysis is further performed on the signals obtained through pitch analysis and noise shaping analysis, and the speech signal obtained after high-pass filtering. Then, LSF parameters are extracted, feature parameters are extracted by using a plurality of levels of vector quantization, and then quantized parameters are converted into LPC coefficients. Synchronization of encoding and decoding is implemented through this conversion. Based on this, noise shaping quantization is performed. Noise shaping quantization herein is to quantize a noise-shaped excitation signal. During quantization, one level or a plurality of levels of subband decomposition may be performed on the excitation signal to obtain a plurality of subband excitation signals in different frequency ranges. An auditory perception representational value of each subband excitation signal is calculated based on an absolute power of each frequency point in the subband excitation signal. Then, for a first subband excitation signal whose auditory perception representational value is less than or equal to an auditory perception threshold, a gain of the first subband excitation signal relative to a reference excitation signal is determined, and the gain is determined as an encoding parameter corresponding to the first subband excitation signal. For a plurality of second subband excitation signals whose auditory perception representational values are greater than the auditory perception threshold, the second subband excitation signals are sorted in descending order of the auditory perception representational values to obtain a sorting result. Gains respectively corresponding to the second subband excitation signals are determined based on respective ordinal positions of the second subband excitation signals in the sorting result. The gains respectively corresponding to the second subband excitation signals increase in the sorting order in the sorting result. The second subband excitation signals are quantized based on the respective gains of the second subband excitation signals, to obtain encoding parameters respectively corresponding to the second subband excitation signals. Finally, range encoding is performed on all the obtained parameters. In this way, the entire encoding process is implemented.

Figure 10:
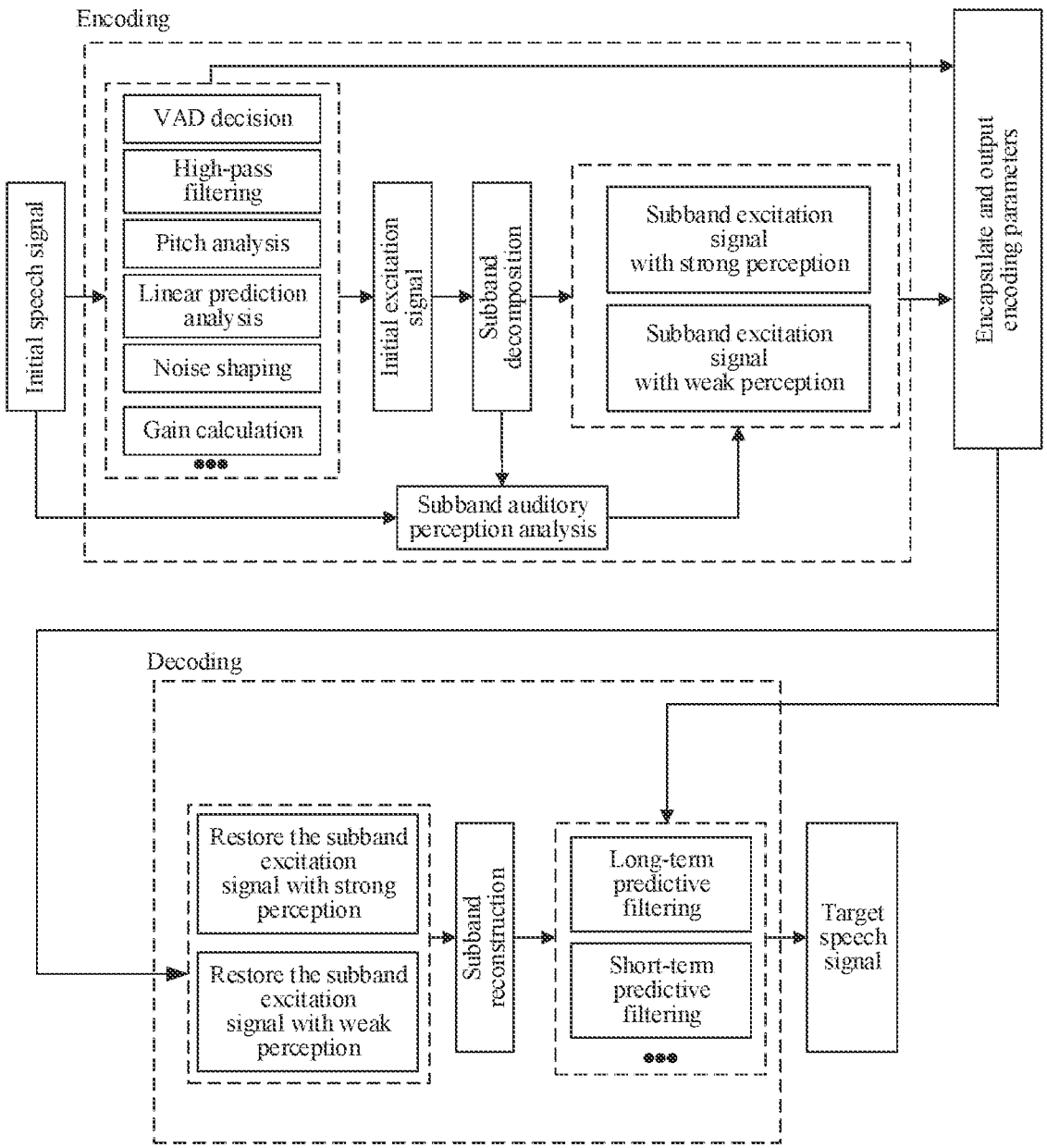
FIG. 10 is a schematic flowchart of a speech encoding method and a speech decoding method according to a specific embodiment.

In a specific embodiment, with reference to FIG. 10, this application further provides a speech encoding method and a speech decoding method. In the related art, subband encoding may be used to implement encoding in an encoding process. A basic idea of speech subband encoding is that a group of band-pass filters (BPFs) is used to divide a frequency band of an input audio signal into several contiguous small bands. Each of the small bands is referred to as a subband. An audio signal in each subband is encoded by using a separate encoding scheme. Code of the subbands is combined when being transmitted over a channel. During decoding at a receiving end, the code of each subband is decoded separately, and then decoded code is combined to restore an original audio signal. In subband encoding, bits can be properly allocated to each subband based on auditory characteristics of a human ear, so as to achieve better subjective auditory effect and reduce storage resources and transmission bandwidths. For example, an Opus encoder internally implements division into high-frequency and low-frequency subbands. A SILK encoder is used for the low-frequency subbands, whereas a CELT encoder is used for the high-frequency subbands. In other words, in the related art, subband encoding is mainly a process of performing encoding for various subbands separately by using different encoders or different encoding parameters. Based on signal characteristics of different subbands, proper encoding schemes are chosen for encoding. A subband encoding scheme can effectively improve encoding efficiency of an encoder. However, a subband encoder in the related art ignores an auditory perception contribution of each subband in a frame. This application provides the following: An encoding scheme with an extremely low bit rate is used for a subband with weak perception energy based on analysis of auditory perception energy. Encoding is performed for the subband by using an extremely small quantity of bits, so as to further improve efficiency of subband encoding. Different from a related solution, in this application, bits to be used for encoding are allocated to each subband based on an auditory perception contribution. More bits to be used for encoding may be allocated to a subband with a large auditory perception contribution, whereas an extremely small quantity of bits may be directly used for encoding of a subband with weak auditory perception. Thus, encoding bandwidths are allocated efficiently and properly.

Specifically, with reference to FIG. 10, the speech encoding method is as follows:

A collected speech signal is used as an initial speech signal. A first device first performs frame blocking and windowing on the initial speech signal, to obtain a plurality of frames of speech sub-signal. For each frame of speech sub-signal, the first device performs pre-processing such as voice activity detection, high-pass filtering, pitch analysis, linear predictive coding, noise shaping, and gain calculation, to obtain an initial excitation signal. The initial excitation signal is used as a target speech signal. Subband decomposition is performed on the target speech signal. For example, a group of quadrature mirror filters (QMFs) is used to perform symmetric subband decomposition to obtain a high-frequency subband excitation signal and a low-frequency subband excitation signal with an equal frequency bandwidth. If finer subband decomposition is required, decomposition may continue to be performed, by using the QMFs, on the high-frequency subband excitation signal obtained through decomposition, to obtain more finer subband signals. For example, three levels of decomposition may be performed, by using the QMFs, to obtain four subband excitation signals: exc1_low, exc2_low, exc3_high, and exc3_low. For specific information, refer to the description in the foregoing embodiment.

The first device may perform subband auditory perception analysis on each subband excitation signal, to classify the subband excitation signals into subband excitation signals with strong perception and subband excitation signals with weak perception. Specifically, an auditory loudness level of each frequency point is calculated by using the foregoing formula (2) to formula (5); then an auditory perception coefficient of each frequency point is calculated by using the foregoing formula (6); and finally a weighted sum of absolute powers of the frequency points is calculated by using the foregoing formula (1), to obtain an auditory perception representational value of a subband excitation signal. An auditory perception representational value of each subband excitation signal is compared with an auditory perception threshold. A subband excitation signal whose auditory perception representational value is less than or equal to the auditory perception threshold is determined as a subband excitation signal with weak perception (that is, the foregoing first subband excitation signal). A subband excitation signal whose auditory perception representational value is greater than the auditory perception threshold is determined as a subband excitation signal with strong perception (that is, the foregoing second subband excitation signal). For a subband excitation signal with weak perception, quantization encoding does not need to be performed. Only a sum of squares of amplitudes of sampling points of the subband excitation signal is calculated to obtain an energy value corresponding to the subband excitation signal. The energy value is divided by a preset energy value corresponding to a reference excitation signal, to obtain a gain corresponding to the subband excitation signal. For a plurality of subband excitation signals with strong perception, the subband excitation signals are sorted in descending order of auditory perception representational values to obtain a sorting result. Then, different quantization is performed based on respective ordinal positions of the subband excitation signals with strong perception in the sorting result to obtain corresponding quantized excitation signals. Quantization precision with which the subband excitation signals with strong perception are quantized separately to obtain the quantized signals decreases in the sorting order in the sorting result. Finally, the gain of the subband excitation signal with weak perception, the quantized excitation signals of the subband excitation signals with strong perception, and another encoding parameter are compressed and encapsulated to obtain encoded data. The encoded data is transmitted to a second device. Thus, in the transmitted encoded data, for the subband excitation signal with weak perception, only the gain is transmitted, and no quantized excitation signal is transmitted; the quantized excitation signals of only the subband excitation signals with strong perception are transmitted. In addition, because the subband excitation signals with strong perception are quantized with different quantization precision, more bits to be used for encoding can be allocated to the subband excitation signals with strong perception and with larger auditory perception representational values. In this way, an encoding bit rate can be further reduced, with little impact on subjective auditory quality that exists after speech is encoded and then decoded.

Further, still with reference to FIG. 10, a speech decoding process is as follows:

After receiving the encoded data, the second device first parses the encoded data to obtain all encoding parameters. The subband excitation signals with strong perception in the encoding process can be parsed to obtain quantization gains and the quantized excitation signals. The quantization gains of the subbands are multiplied by the quantized excitation signals to obtain restored excitation signals of the subbands. The subband with weak auditory perception is parsed to obtain only the gain. The gain is multiplied by the preset reference excitation signal (an excitation amplitude of the signal is 1) to obtain a restored excitation signal of the subband with weak perception. Then, subband reconstruction is performed on the restored excitation signals of all the subbands. The subband reconstruction process is a reverse process of the subband decomposition process. To be specific, based on a corresponding combination in subband decomposition in the encoding process, subband synthesis is performed by using a group of quadrature mirror filters (QMFs). For example, if three levels of subband decomposition are performed in the encoding process, three levels of subband synthesis need to be performed. For example, in the foregoing example, synthesis is performed, by using the QMFs, on exc3_high and exc3_low to obtain exc2_high; then synthesis is performed, by using the QMFs, on exc2_high and exc2_low to obtain exc1_high; and finally synthesis is performed, by using the QMFs, on exc1_high and exc1_low to obtain a complete (a spectral bandwidth is 8 kHz) excitation signal output. Subsequently, post-processing is performed by following a normal decoding process, including processing such as long-term predictive filtering and short-term predictive filtering. Finally, a target speech signal that is generated after decoding and that can be used for playing is obtained.

The first device and the second device may agree that when the quantized excitation signals of the subband excitation signals with strong perception are multiplied by the respective gains in the decoding process, the used gains increase based on an initial gain in a preset increasing mode. Each ordinal position corresponds to a gain multiple. For specific information, refer to the description in the foregoing embodiment. The initial gain is a gain that a decoding end obtains by parsing an encoded data packet. Because the first device and the second device agree on the preset increasing mode, the first device only needs to transmit the initial gain to the second device. In this way, encoding efficiency can be further improved, and bandwidths can be effectively reduced.

This application further provides an application scenario. In the application scenario, the speech encoding method and the speech decoding method are used. A first user and a second user make a voice call in the application scenario. When the first user and the second user make a voice call, encoding, transmission, and decoding may be performed for speech signals of the first user and speech signals of the second user by using the speech encoding method and the speech decoding method provided in this application. In this way, the voice call between the first user and the second user is implemented. During specific implementation, when the first user transmits speech signals to the second user, a terminal of the first user is a first device, and a terminal of the second user is a second device. For example, the terminal of the first user is a vehicle-mounted terminal, and the terminal of the second user is a mobile phone. After the vehicle-mounted terminal of the first user and the mobile phone of the second user establish a communication connection, the vehicle-mounted terminal of the first user may serve as the first device to collect speech signals of the first user, encode the speech signals to obtain encoded data, and transmit the encoded data to the mobile phone of the second user; and the mobile phone of the second user may serve as the second device to decode the encoded data to regenerate speech signals and perform playing. Likewise, the mobile phone of the second user may also serve as the first device to transmit encoded data to the vehicle-mounted terminal of the first user; and the vehicle-mounted terminal of the first user may also serve as the second device to decode the encoded data, generate speech data, and perform playing. This application may also be applied to a video calling scenario. A social communication application may be installed on both a terminal of a first user and a terminal of a second user. The first user and the second user make a video call by using the social communication application. During the video call, encoding, transmission, and decoding may be performed for speech signals of the first user and speech signals of the second user by using the speech encoding method and the speech decoding method provided in the embodiments of this application. In this way, the speech signals in the video call between the first user and the second user are transmitted.

This application further provides another application scenario. In the application scenario, the speech encoding method and the speech decoding method in this application may also be used in a live video streaming scenario. A first device may be a terminal of an anchor. A second device may be a terminal of a viewer. A client may be installed and run on the terminal of the anchor and the terminal of the viewer. The client may be configured for logging in to an account of the anchor or an account of the viewer. If the account of the anchor is logged in to on the client, the terminal on which the client is run may be configured to encode, by using the speech encoding method provided in the embodiments of this application, speech signals collected in real time during live streaming, and then upload post-encoding encoded data to a server. If the account of the viewer is logged in to on the client, the terminal on which the client is run may be configured to obtain the encoded data from the server, then decode the encoded data by using the speech decoding method provided in the embodiments of this application to obtain target speech signals, and perform playing.

The speech encoding method and the speech decoding method provided in the embodiments of this application may also be used in other application scenarios, such as audio/video conferencing and audio broadcasting.

Although the operations in the flowcharts used in the foregoing embodiments are displayed sequentially as indicated by arrows, these operations are not necessarily performed in an order indicated by the arrows. Unless otherwise explicitly specified in this specification, there is no strict order for performing of these operations. These operations may be performed in other orders. In addition, at least some of the operations in the flowcharts used in the foregoing embodiments may include a plurality of operations or a plurality of phases. These operations or phases are not necessarily performed at the same moment, and instead, may be performed at different moments. These operations or phases are not necessarily performed sequentially either, and instead, may be performed alternately with other operations or with at least some of operations or phases in other operations.

Based on the same inventive concept, the embodiments of this application further provide a speech encoding apparatus that is configured to implement the foregoing related speech encoding method or a speech decoding apparatus that is configured to implement the foregoing related speech decoding method. A problem-solving implementation solution provided by the apparatus is similar to the implementation solution described in the foregoing method. Therefore, for specific limitations in one or more embodiments of the speech encoding apparatus and the speech decoding apparatus provided below, refer to the limitations on the speech encoding method and the speech decoding method in the foregoing descriptions. Details are not described herein again.

Figure 11:
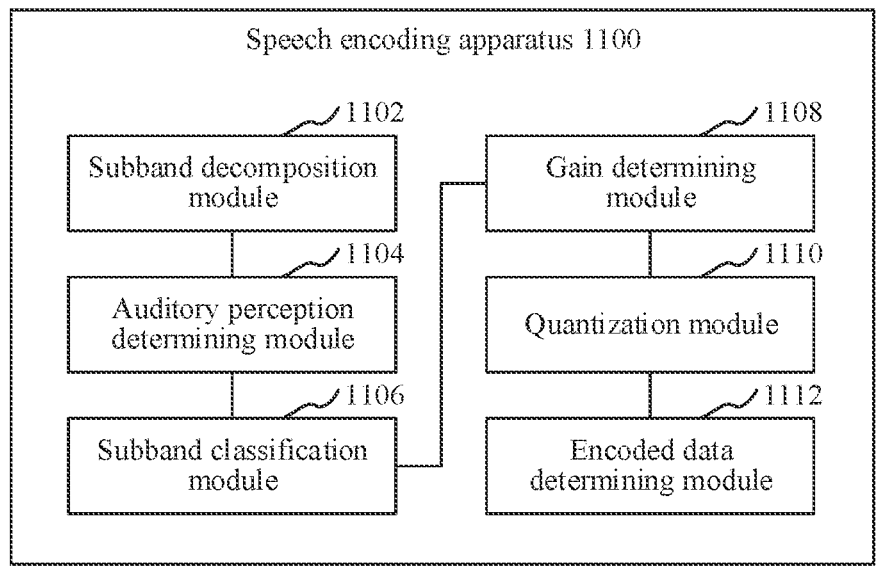
FIG. 11 is a block diagram of a structure of a speech encoding apparatus according to an embodiment.

In an embodiment, as shown in FIG. 11, a speech encoding apparatus 1100 is provided, including:

- a subband decomposition module 1102, configured to: obtain a target speech signal, and perform subband decomposition on the speech signal to obtain at least two subband excitation signals;
- an auditory perception determining module 1104, configured to obtain an auditory perception representational value that corresponds to each subband excitation signal, the auditory perception representational value being positively correlated with a sound intensity that is of the corresponding subband excitation signal and that is perceived by a human ear;
- a subband classification module 1106, configured to determine at least one first subband excitation signal and at least one second subband excitation signal from the at least two subband excitation signals, the auditory perception representational value of each first subband excitation signal being less than or equal to a preset auditory perception threshold, and the auditory perception representational value of each second subband excitation signal being greater than the auditory perception threshold;
- a gain determining module 1108, configured to: obtain a gain of each of the at least one first subband excitation signal relative to a preset reference excitation signal, and determine the gain as an encoding parameter that corresponds to the first subband excitation signal;
- a quantization module 1110, configured to obtain a corresponding encoding parameter that is obtained by quantizing each of the at least one second subband excitation signal; and
- an encoded data determining module 1112, configured to: perform encoding for each subband excitation signal based on the encoding parameter corresponding to the subband excitation signal, and determine, based on encoded data corresponding to each subband excitation signal, encoded data corresponding to the speech signal.

The speech encoding apparatus determines the at least one first subband excitation signal and the at least one second subband excitation signal from the at least two subband excitation signals. The auditory perception representational value of each first subband excitation signal is less than or equal to the preset auditory perception threshold. Therefore, a sound intensity that is of the first subband excitation signal and that is perceived by a human car is weak. As such, the first subband excitation signal may not be quantized, and the gain relative to the preset reference excitation signal is obtained and used as an encoding parameter, so as to reduce a quantity of subbands that need to be quantized in the encoding process, and improve encoding efficiency. In addition, because only a gain needs to be encoded for a subband with weak auditory perception, a quantity of parameters that need to be encoded decreases. Thus, an encoding bit rate can be effectively reduced, bandwidths can be better utilized, and an effective compression ratio of signals can be increased.

In an embodiment, a feature value of a frequency point is an absolute power, and the auditory perception determining module is further configured to: obtain an auditory perception coefficient of each frequency point in a subband excitation signal, the auditory perception coefficient being positively correlated with an auditory loudness level, and the auditory loudness level being configured for describing a loudness level of sound; and calculate a weighted sum of absolute powers of the frequency points in the subband excitation signal based on the auditory perception coefficients of the frequency points, to obtain the auditory perception representational value that corresponds to the subband excitation signal.

In an embodiment, the auditory perception determining module is further configured to: obtain preset acoustic equal-loudness level contours data, the acoustic equal-loudness level contours data being configured for describing relationships between sound pressure levels and frequencies for a condition of equal loudness levels; perform, for each frequency point in the subband excitation signal, linear interpolation on the preset acoustic equal-loudness level contours data based on a frequency of the frequency point, to obtain a sound pressure level of the frequency point; and determine a loudness level of the frequency point based on the sound pressure level of the frequency point and according to preset mapping relationships between sound pressure levels and loudness levels, and determine the auditory perception coefficient of the frequency point based on the loudness level, the auditory perception coefficient being positively correlated with the loudness level.

In an embodiment, the gain determining module is further configured to: obtain, for each first subband excitation signal, an energy value corresponding to the first subband excitation signal, the energy value being positively correlated with amplitudes of sampling points of the first subband excitation signal in time domain; obtain an energy value corresponding to the preset reference excitation signal; and determine the gain of the first subband excitation signal relative to the reference excitation signal based on a ratio of the energy value corresponding to the first subband excitation signal to the energy value corresponding to the reference excitation signal.

In an embodiment, when the at least one second subband excitation signal includes a plurality of second subband excitation signals, the quantization module is further configured to: sort the plurality of second subband excitation signals in descending order of the corresponding auditory perception representational values, to obtain a sorting result; and quantize the plurality of second subband excitation signals differently based on their respective ordinal positions in the sorting result, to obtain the encoding parameters corresponding to the plurality of second subband excitation signals, quantization precision with which the plurality of second subband excitation signals are quantized separately to obtain quantized signals decreasing in the sorting order in the sorting result.

In an embodiment, the quantization module is further configured to: determine, for the plurality of second subband excitation signals, their respective corresponding gains based on their respective ordinal positions in the sorting result, the gains respectively corresponding to the second subband excitation signals increasing in the sorting order in the sorting result; and quantize each second subband excitation signal based on the gain corresponding to the second subband excitation signal, to obtain a quantized excitation signal of the second subband excitation signal.

In an embodiment, the quantization module is further configured to: obtain an initial gain, the initial gain being determined based on a to-be-encoded initial speech signal, and the target speech signal being obtained after the initial speech signal is processed before being encoded; determine the initial gain as the gain of the second subband excitation signal that is in the first position in the sorting result; and perform increasing based on the initial gain, to determine the gains corresponding to the second subband excitation signals that are in the second and following positions in the sorting result, the initial gain being configured for being encoded into the encoded data, so that the gain corresponding to each second subband excitation signal is determined based on the initial gain during decoding.

In an embodiment, the subband decomposition module is further configured to: determine a frequency range in which the speech signal is; and perform at least one level of subband decomposition on the speech signal based on the frequency range in which the speech signal is, to obtain at least two subband excitation signals, each level of subband decomposition implementing decomposition of a signal that needs to be decomposed into two signals in different frequency intervals.

In an embodiment, when the at least one level of subband decomposition includes a plurality of levels of subband decomposition, the subband decomposition module is further configured to: perform, at the first level of subband decomposition, subband decomposition on the speech signal based on the frequency range in which the speech signal is, to obtain a high-frequency decomposition signal and a low-frequency decomposition signal of the current level, and determine the high-frequency decomposition signal as a subband excitation signal, an arbitrary frequency in a frequency interval in which the high-frequency decomposition signal is being higher than an arbitrary frequency in a frequency interval in which the low-frequency decomposition signal is; perform, at each of the second level and following levels, and based on a frequency interval in which a low-frequency decomposition signal obtained through subband decomposition of a previous level is, subband decomposition on the low-frequency decomposition signal obtained through subband decomposition of the previous level, to obtain a high-frequency decomposition signal and a low-frequency decomposition signal of the current level; and determine, when the last level of subband decomposition is completed, a low-frequency decomposition signal obtained through subband decomposition of the last level as a subband excitation signal.

In an embodiment, the quantization module is further configured to: search, for each second subband excitation signal, a preset codebook for a codebook vector with a minimum quantization error; and determine a codebook address corresponding to the found codebook vector as the corresponding encoding parameter of the second subband excitation signal.

Figure 12:
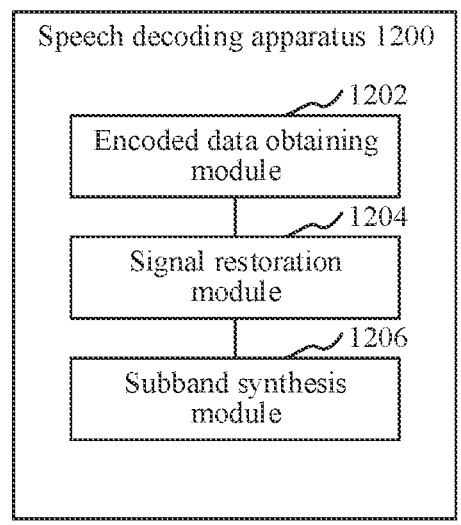
FIG. 12 is a block diagram of a structure of a speech decoding apparatus according to an embodiment.

In an embodiment, as shown in FIG. 12, a speech decoding apparatus 1200 is provided, including:

an encoded data obtaining module 1202, configured to: obtain encoded data that is obtained by encoding a target speech signal, and determine, based on the encoded data, encoding parameters of at least two subband excitation signals that correspond to the target speech signal, the at least two subband excitation signals including at least one first subband excitation signal and at least one second subband excitation signal, an auditory perception representational value of each first subband excitation signal being less than or equal to a preset auditory perception threshold, an auditory perception representational value of each second subband excitation signal being greater than the auditory perception threshold, and the auditory perception representational value being positively correlated with a sound intensity that is of the corresponding subband excitation signal and that is perceived by a human ear;

a signal restoration module 1204, configured to: obtain a preset reference excitation signal, and perform signal restoration based on the reference excitation signal and the encoding parameter of each first subband excitation signal, to obtain a first restored excitation signal corresponding to each first subband excitation signal; and perform signal restoration based on the encoding parameter of each second subband excitation signal, to obtain a second restored excitation signal corresponding to each second subband excitation signal; and a subband synthesis module 1206, configured to perform signal subband synthesis based on each first restored excitation signal and each second restored excitation signal, to obtain a restored speech signal.

The speech decoding apparatus may perform signal restoration based on a reference excitation signal and a gain, to obtain a first restored excitation signal; may perform signal restoration based on a quantized excitation signal, to obtain a second restored excitation signal; and may perform signal subband synthesis based on the first restored excitation signal and the second restored excitation signal. Therefore, an accurate target speech signal can be obtained through decoding.

All or some of the modules in the speech encoding apparatus and the speech decoding apparatus may be implemented by software, hardware, or a combination thereof. The modules may be built in or stand alone from a processor in a computer device in a form of hardware, or may be stored in a memory in a computer device in a form of software, so that a processor can invoke and execute operations corresponding to the modules. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a first device or a second device. An internal structure of the computer device may be shown in FIG. 13. The computer device includes a processor, a memory, an input/output interface, a communication interface, a display unit, and an input apparatus. The processor and the memory are connected to the input/output interface by using a system bus. The communication interface, the display unit, and the input apparatus are connected to the system bus by using the input/output interface. The processor of the computer device is configured to provide computing and control capabilities. The memory of the computer device includes a nonvolatile storage medium and an internal memory. The nonvolatile storage medium stores an operating system and computer-readable instructions. The internal memory provides an environment for operation of the operating system and the computer-readable instructions in the nonvolatile storage medium. The input/output interface of the computer device is configured to exchange information between the processor and an external device. The communication interface of the computer device is configured to communicate with an external terminal in a wired or wireless mode. The wireless mode may be implemented by using Wi-Fi, a mobile cellular network, near field communication (NFC), or another technology. When being executed by the processor, the computer-readable instructions implement a speech encoding method or a speech decoding method. The display unit of the computer device is configured to form visually visible pictures, and may be a display, a projection apparatus, or a virtual reality imaging apparatus. The display may be a liquid crystal display or an electronic ink display. The input apparatus of the computer device may be a touch layer covering a display, or may be a button, trackball, or touchpad disposed on a housing of the computer device, or may be an external keyboard, touchpad, mouse, or the like.

Figure 13:
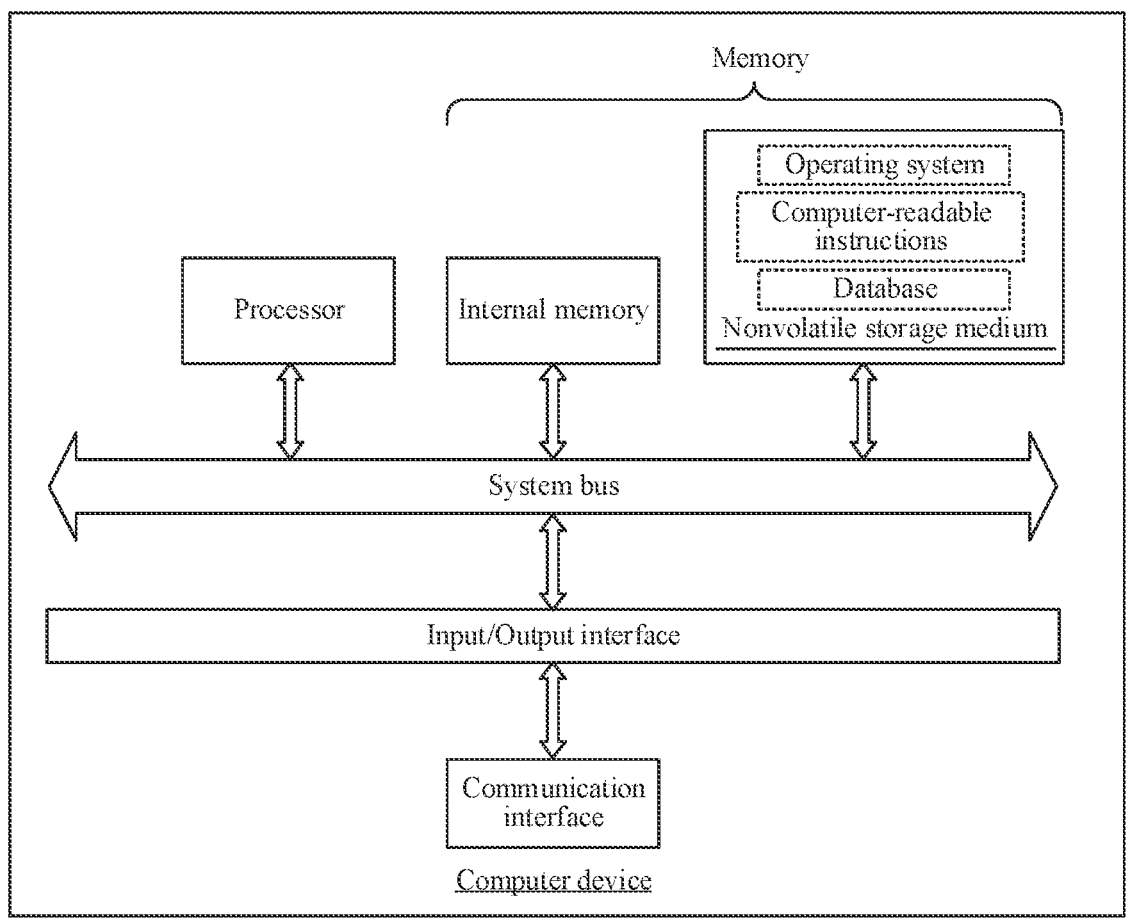
FIG. 13 is a diagram of an internal structure of a computer device according to an embodiment.

A person skilled in the art may understand that the structure shown in FIG. 13 is merely a block diagram of a partial structure related to the solutions in this application, and does not constitute a limitation on a computer device on which the solutions in this application are used. A specific computer device may include more or fewer components than those shown in the figure, or combine some components, or have different component arrangements.

In an embodiment, a computer device is provided, including a memory and a processor. The memory stores computer-readable instructions. The processor, when executing the computer-readable instructions, implements operations of the speech encoding method or the speech decoding method.

In an embodiment, a non-transitory computer-readable storage medium is provided, having computer-readable instructions stored therein. The computer-readable instructions, when being executed by a processor, implement operations of the speech encoding method or the speech decoding method.

In an embodiment, a computer program product is provided, including computer-readable instructions. The computer-readable instructions, when being executed by a processor, implement operations of the speech encoding method or the speech decoding method.

User information (including but not limited to user device information and user personal information) and data (including but not limited to data used for analysis, stored data, and displayed data) used in this application are both authorized by users or fully authorized by all parties. In addition, related data needs to be collected, used, and processed in compliance with related laws, regulations, and standards in related countries and territories.

A person of ordinary skill in the art may understand that all or some of procedures in the methods in the foregoing embodiments may be implemented by computer-readable instructions instructing related hardware. The computer-readable instructions may be stored in a nonvolatile computer-readable storage medium. When the computer-readable instructions are executed, the procedures in the embodiments of the methods can be implemented. Any reference to a memory, a database, or another medium used in the embodiments provided in this application may include at least one of a nonvolatile memory and a volatile memory. A nonvolatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, or the like. A volatile memory may include a random access memory (RAM), an external cache, or the like. As an illustration rather than a limitation, a RAM may be in a plurality of forms, such as a static random access memory (SRAM) or a dynamic random access memory (DRAM). A database used in the embodiments provided in this application may include at least one of a relational database and a non-relational database. A non-relational database may include a blockchain-based distributed database or the like, but is not limited thereto. A processor used in the embodiments provided in this application may be a general-purpose processor, a central processing unit, a graphics processing unit, a digital signal processor, a programmable logic device, a quantum computing-based data processing logic device, or the like, but is not limited thereto.

Technical features in the foregoing embodiments may be combined in different manners to form other embodiments. To make descriptions concise, not all possible combinations of the technical features in the foregoing embodiments are described. However, the combinations of the technical features shall be considered as falling within the scope described in this specification, provided that no conflict exists.

The foregoing embodiments show only several implementations of this application and are described in detail, which, however, are not to be construed as a limitation on the patent scope of this application. For a person of ordinary skill in the art, several variations and improvements can be made without departing from the idea of this application. These variations and improvements all fall with the protection scope of this application. Therefore, the protection scope of this application shall be subject to the appended claims.

What is claimed is:

1. A speech encoding method performed by a computer device, the method comprising:
    performing subband decomposition on a target speech signal to obtain a plurality of subband excitation signals;
    obtaining an auditory perception representational value that corresponds to each subband excitation signal;
    determining at least one first subband excitation signal and at least one second subband excitation signal from the plurality of subband excitation signals, the auditory perception representational value of the at least one first subband excitation signal being less than or equal to a preset auditory perception threshold, and the auditory perception representational value of the at least one second subband excitation signal being greater than the auditory perception threshold;
    obtaining a gain of each of the at least one first subband excitation signal relative to a preset reference excitation signal as an encoding parameter that corresponds to the first subband excitation signal;
    obtaining a corresponding encoding parameter that is obtained by quantizing each of the at least one second subband excitation signal; and
    performing encoding on each subband excitation signal based on the encoding parameter corresponding to the subband excitation signal.

2. The method according to claim 1, wherein the obtaining an auditory perception representational value that corresponds to each subband excitation signal comprises:
    obtaining, for each subband excitation signal, a feature value of each frequency point in the subband excitation signal; and performing a statistical operation on the feature values of the frequency points, to obtain the auditory perception representational value that corresponds to the subband excitation signal.

3. The method according to claim 1, wherein the obtaining a gain of each of the at least one first subband excitation signal relative to a preset reference excitation signal comprises:

obtaining, for each first subband excitation signal, an energy value corresponding to the first subband excitation signal, the energy value being positively correlated with amplitudes of sampling points of the first subband excitation signal in time domain;

obtaining an energy value corresponding to the preset reference excitation signal; and determining the gain of the first subband excitation signal relative to the reference excitation signal based on a ratio of the energy value corresponding to the first subband excitation signal to the energy value corresponding to the reference excitation signal.

4. The method according to claim 1, wherein the performing subband decomposition on the target speech signal to obtain a plurality of subband excitation signals comprises:

determining a frequency range for the target speech signal; and performing at least one level of subband decomposition on the target speech signal based on the frequency range to obtain the plurality of subband excitation signals.

5. The method according to claim 4, wherein each level of subband decomposition decomposes the target speech signal into the plurality of signals in different frequency intervals.

6. The method according to claim 1, wherein the obtaining a corresponding encoding parameter that is obtained by quantizing each of the at least one second subband excitation signal comprises:

searching, for each second subband excitation signal, a preset codebook for a codebook vector with a minimum quantization error; and determining a codebook address corresponding to the found codebook vector as the corresponding encoding parameter of the second subband excitation signal.

7. The method according to claim 1, wherein the auditory perception representational value is positively correlated with a sound intensity that is of the corresponding subband excitation signal and that is perceived by a human ear.

8. A computer device, comprising a memory and a processor, the memory storing computer-readable instructions that, when executed by the processor, cause the computer device to implement a speech encoding method including:

performing subband decomposition on a target speech signal to obtain a plurality of subband excitation signals;

obtaining an auditory perception representational value that corresponds to each subband excitation signal;

determining at least one first subband excitation signal and at least one second subband excitation signal from the plurality of subband excitation signals, the auditory perception representational value of the at least one first subband excitation signal being less than or equal to a preset auditory perception threshold, and the auditory perception representational value of the at least one second subband excitation signal being greater than the auditory perception threshold;

obtaining a gain of each of the at least one first subband excitation signal relative to a preset reference excitation signal as an encoding parameter that corresponds to the first subband excitation signal;

obtaining a corresponding encoding parameter that is obtained by quantizing each of the at least one second subband excitation signal; and performing encoding on each subband excitation signal based on the encoding parameter corresponding to the subband excitation signal.

9. The computer device according to claim 8, wherein the obtaining an auditory perception representational value that corresponds to each subband excitation signal comprises:

obtaining, for each subband excitation signal, a feature value of each frequency point in the subband excitation signal; and performing a statistical operation on the feature values of the frequency points, to obtain the auditory perception representational value that corresponds to the subband excitation signal.

10. The computer device according to claim 8, wherein the obtaining a gain of each of the at least one first subband excitation signal relative to a preset reference excitation signal comprises:

obtaining, for each first subband excitation signal, an energy value corresponding to the first subband excitation signal, the energy value being positively correlated with amplitudes of sampling points of the first subband excitation signal in time domain;

obtaining an energy value corresponding to the preset reference excitation signal; and determining the gain of the first subband excitation signal relative to the reference excitation signal based on a ratio of the energy value corresponding to the first subband excitation signal to the energy value corresponding to the reference excitation signal.

11. The computer device according to claim 8, wherein the performing subband decomposition on the target speech signal to obtain a plurality of subband excitation signals comprises:

determining a frequency range for the target speech signal; and performing at least one level of subband decomposition on the target speech signal based on the frequency range to obtain the plurality of subband excitation signals.

12. The computer device according to claim 11, wherein each level of subband decomposition decomposes the target speech signal into the plurality of signals in different frequency intervals.

13. The computer device according to claim 8, wherein the obtaining a corresponding encoding parameter that is obtained by quantizing each of the at least one second subband excitation signal comprises:

searching, for each second subband excitation signal, a preset codebook for a codebook vector with a minimum quantization error; and determining a codebook address corresponding to the found codebook vector as the corresponding encoding parameter of the second subband excitation signal.

14. The computer device according to claim 8, wherein the auditory perception representational value is positively correlated with a sound intensity that is of the corresponding subband excitation signal and that is perceived by a human ear.

15. A non-transitory computer-readable storage medium, having computer-readable instructions stored therein, the computer-readable instructions, when being executed by a processor of a computer device, causing the computer device to implement a speech encoding method including:

performing subband decomposition on a target speech signal to obtain a plurality of subband excitation signals;

obtaining an auditory perception representational value that corresponds to each subband excitation signal;

determining at least one first subband excitation signal and at least one second subband excitation signal from the plurality of subband excitation signals, the auditory perception representational value of the at least one first subband excitation signal being less than or equal to a preset auditory perception threshold, and the auditory perception representational value of the at least second subband excitation signal being greater than the auditory perception threshold;

obtaining a gain of each of the at least one first subband excitation signal relative to a preset reference excitation signal as an encoding parameter that corresponds to the first subband excitation signal;

obtaining a corresponding encoding parameter that is obtained by quantizing each of the at least one second subband excitation signal; and performing encoding on each subband excitation signal based on the encoding parameter corresponding to the subband excitation signal.

16. The non-transitory computer-readable storage medium according to claim 15, wherein the obtaining an auditory perception representational value that corresponds to each subband excitation signal comprises:

obtaining, for each subband excitation signal, a feature value of each frequency point in the subband excitation signal; and performing a statistical operation on the feature values of the frequency points, to obtain the auditory perception representational value that corresponds to the subband excitation signal.

17. The non-transitory computer-readable storage medium according to claim 15, wherein the obtaining a gain of each of the at least one first subband excitation signal relative to a preset reference excitation signal comprises:

obtaining, for each first subband excitation signal, an energy value corresponding to the first subband excitation signal, the energy value being positively correlated with amplitudes of sampling points of the first subband excitation signal in time domain;

obtaining an energy value corresponding to the preset reference excitation signal; and determining the gain of the first subband excitation signal relative to the reference excitation signal based on a ratio of the energy value corresponding to the first subband excitation signal to the energy value corresponding to the reference excitation signal.

18. The non-transitory computer-readable storage medium according to claim 15, wherein the performing subband decomposition on the target speech signal to obtain a plurality of subband excitation signals comprises:

determining a frequency range for the target speech signal; and performing at least one level of subband decomposition on the target speech signal based on the frequency range to obtain the plurality of subband excitation signals.

19. The non-transitory computer-readable storage medium according to claim 15, wherein the obtaining a corresponding encoding parameter that is obtained by quantizing each of the at least one second subband excitation signal comprises:

searching, for each second subband excitation signal, a preset codebook for a codebook vector with a minimum quantization error; and determining a codebook address corresponding to the found codebook vector as the corresponding encoding parameter of the second subband excitation signal.

20. The non-transitory computer-readable storage medium according to claim 15, wherein the auditory perception representational value is positively correlated with a sound intensity that is of the corresponding subband excitation signal and that is perceived by a human ear.

* * * * *